(12) United States Patent
Lehtiniemi et al.

(10) Patent No.: US 9,791,297 B2
(45) Date of Patent: Oct. 17, 2017

(54) DETERMINATION OF A CHARGE SURFACE POSITION

(71) Applicant: Nokia Corporation, Espoo (FI)

(72) Inventors: Arto Juhani Lehtiniemi, Lempaala (FI); Antti Johannes Eronen, Tampere (FI); Jussi Artturi Leppanen, Tampere (FI)

(73) Assignee: Nokia Technologies Oy, Espoo (FI)

( * ) Notice: Subject to any disclaimer, the term of this patent is extended or adjusted under 35 U.S.C. 154(b) by 345 days.

(21) Appl. No.: 14/201,503

(22) Filed: Mar. 7, 2014

(65) Prior Publication Data

US 2015/0253158 A1 Sep. 10, 2015

(51) Int. Cl.
| | |
|---|---|
| *G06F 3/00* | (2006.01) |
| *G06F 13/00* | (2006.01) |
| *H04B 5/00* | (2006.01) |
| *G01D 5/20* | (2006.01) |
| *H02J 7/02* | (2016.01) |
| *H04M 1/725* | (2006.01) |
| *H02J 5/00* | (2016.01) |
| *G06F 1/26* | (2006.01) |

(52) U.S. Cl.
CPC ............... *G01D 5/20* (2013.01); *H02J 5/005* (2013.01); *H02J 7/025* (2013.01); *H04B 5/0037* (2013.01); *H04M 1/72533* (2013.01); *G06F 1/26* (2013.01)

(58) Field of Classification Search
CPC ................................. G06F 1/1632; G06F 1/26
USPC .............................. 710/8, 303, 304; 455/41.1
See application file for complete search history.

(56) References Cited

U.S. PATENT DOCUMENTS

| | | | | |
|---|---|---|---|---|
| 7,652,589 B2 * | 1/2010 | Autor | ...................... | G01C 17/00 312/223.5 |
| 8,464,337 B2 * | 6/2013 | Mathew | ................. | G06F 1/1601 713/166 |
| 8,994,671 B2 * | 3/2015 | Reeves | .................. | G06F 3/1438 345/1.1 |

(Continued)

FOREIGN PATENT DOCUMENTS

EP 2525469 A2 11/2012

OTHER PUBLICATIONS

International Search Report and Written Opinion received in Patent Cooperation Treaty Application No. PCT/FI2015/050129, dated Jun. 9, 2015, 14 pages.

(Continued)

*Primary Examiner* — Faisal M Zaman
(74) *Attorney, Agent, or Firm* — Banner & Witcoff, Ltd.

(57) ABSTRACT

A method comprising determining that the apparatus is placed at a charge surface position on a charger apparatus, the charge surface position being a position of the apparatus on the charge surface of the charger apparatus, and the apparatus being configured to receive a charge signal from the charger apparatus based, at least in part, on placement of the apparatus at the charge surface position, determining that the charge surface position is associated with control of at least one separate apparatus, determining at least one operational directive associated with control of the separate apparatus based, at least in part, on the determination that the charge surface position is associated with control of the separate apparatus, and causing sending of the operational directive to the separate apparatus is disclosed.

17 Claims, 11 Drawing Sheets

(56) References Cited

U.S. PATENT DOCUMENTS

| | | | |
|---|---|---|---|
| 2007/0004451 A1* | 1/2007 | Anderson | G06F 1/1626 455/556.1 |
| 2007/0139000 A1 | 6/2007 | Kozuma et al. | |
| 2008/0108340 A1* | 5/2008 | Karstens | H04M 1/72569 455/418 |
| 2008/0258679 A1 | 10/2008 | Manico et al. | |
| 2008/0263252 A1* | 10/2008 | Habuto | G06F 1/1632 710/303 |
| 2008/0278899 A1* | 11/2008 | Hotelling | G06F 1/1632 361/679.41 |
| 2009/0224723 A1 | 9/2009 | Tanabe | |
| 2010/0146308 A1* | 6/2010 | Gioscia | G06F 1/1632 713/300 |
| 2010/0167783 A1* | 7/2010 | Alameh | H04M 1/0202 455/556.1 |
| 2012/0100868 A1* | 4/2012 | Kim | H04W 4/023 455/456.1 |
| 2012/0115549 A1* | 5/2012 | Kim | H02J 7/0047 455/566 |
| 2012/0206332 A1* | 8/2012 | Yonemoto | G06F 1/1694 345/156 |
| 2012/0246374 A1 | 9/2012 | Fino | |
| 2012/0295634 A1* | 11/2012 | Kim | H02J 7/025 455/456.1 |
| 2012/0295672 A1* | 11/2012 | Kim | H04M 1/2745 455/573 |
| 2013/0241735 A1 | 9/2013 | Nylen | |
| 2014/0002013 A1 | 1/2014 | Kossi et al. | |
| 2014/0135042 A1* | 5/2014 | Buchheim | G01S 1/68 455/456.6 |
| 2015/0017909 A1* | 1/2015 | Meunier | H04N 5/23229 455/41.1 |

OTHER PUBLICATIONS

Apple, Inc., "Airport Express," retrieved, May 24, 2014, http://www.apple.com/fi/airport-express, 6 pages.
Indooratlas, "Game-Changing Indoor Location Service", retrieved May 24, 2014, www.indooratlas.com, 3 pages.
Opus,"Essential Install Magazine," Feb. 2012, 3 pages.
Twonky, "Twonky Server," retrieved May 24, 2014, http://twonky.com, 5 pages.
Wikipedia, "Digital Living Network Alliance," retrieved May 24, 2014, http://en.wikipedia.org/wiki/Digital_Living_Network_Alliance, 9 pages.
Wikipedia, "Universal Plug and Play", retrieved May 24, 2014, http://en.wikipedia.org/wiki/Universal_Plug_and_Play, 9 pages.
Wikipedia, "Inductive Charging", retrieved May 24, 2014, http://en.wikipedia.org/wiki/Inductive_charging, 6 pages.
European Patent Application No. 12199409.9, filed Dec. 27, 2012 in the name of Nokia Corporation, 23 pages.

\* cited by examiner

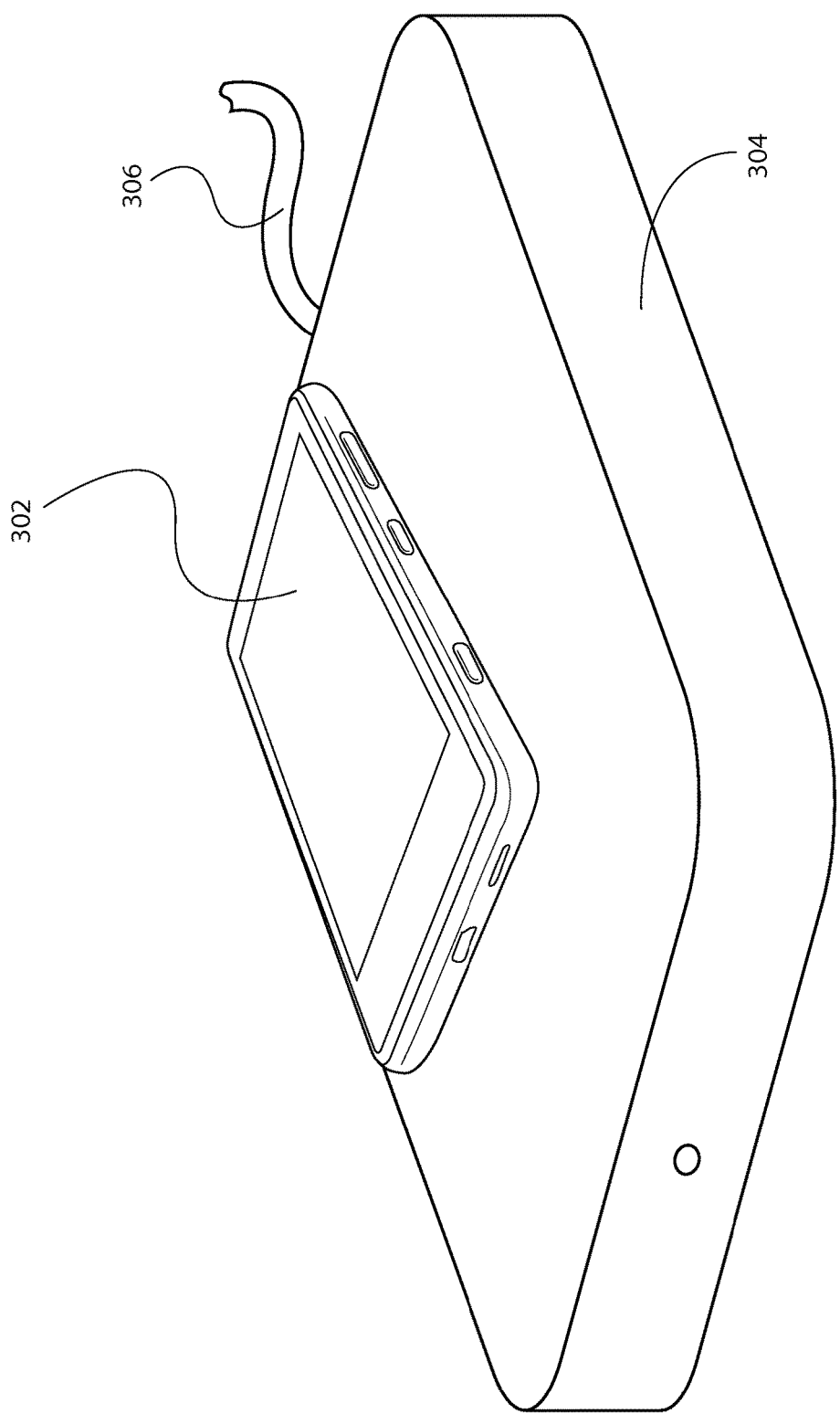

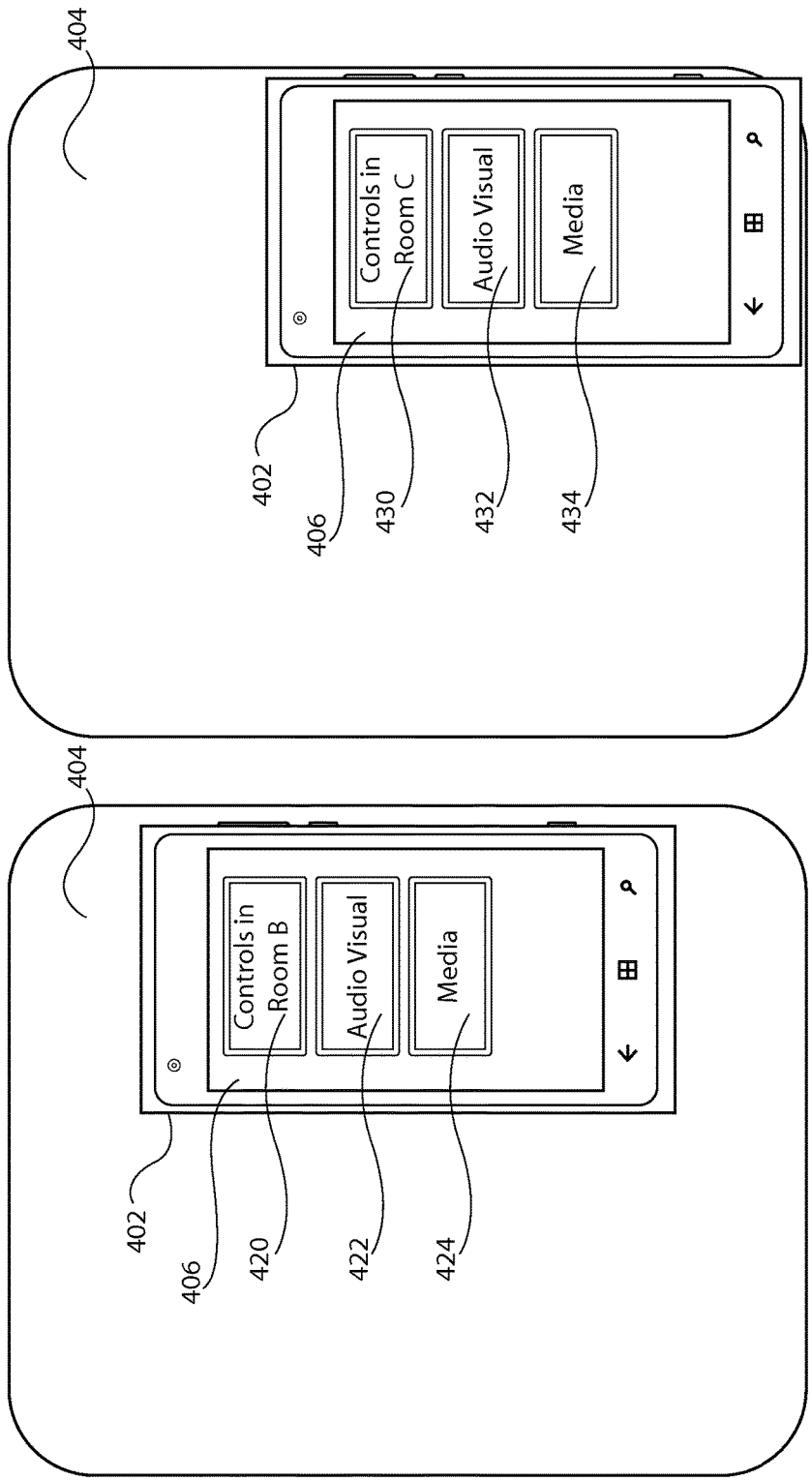

| Charge surface position 500 | Separate apparatus 501 |
|---|---|
| Charge surface position 502 | Separate apparatus 503 |
| Charge surface position 504 | Separate apparatus 505 |

FIG. 5A

| Separate apparatus 510 | Operational directive 511 |
|---|---|
| Separate apparatus 512 | Operational directive 513 |
| Separate apparatus 514 | Operational directive 515 |

FIG. 5B

| Charge surface position 520 | Predefined spatial region 521 |
|---|---|
| Charge surface position 522 | Predefined spatial region 523 |
| Charge surface position 524 | Predefined spatial region 525 |

FIG. 5C

| Charge surface position 530 | Predefined spatial region 531 | Separate apparatus 532 |
|---|---|---|
| Charge surface position 533 | Predefined spatial region 534 | Separate apparatus 535 |
| Charge surface position 536 | Predefined spatial region 537 | Separate apparatus 538 |

FIG. 5D

DETERMINATION OF A CHARGE SURFACE POSITION

TECHNICAL FIELD

The present application relates generally to determination of a charge surface position.

BACKGROUND

Many users have become dependent on electronic apparatuses to manage various aspects of their lives. For example, many users listen to music, stream videos, and/or the like, by way of their electronic apparatuses. From time to time, it may be desirable to replenish an electronic apparatus' power source via charging of the electronic apparatus. In certain circumstances, it may be desirable to tie the charging of an electronic apparatus to certain non-charging operations.

SUMMARY

Various aspects of examples of the invention are set out in the claims.

One or more embodiments may provide an apparatus, a computer readable medium, a non-transitory computer readable medium, a computer program product, and/or a method for determining that the apparatus is placed at a charge surface position on a charger apparatus, the charge surface position being a position of the apparatus on the charge surface of the charger apparatus, and the apparatus being configured to receive a charge signal from the charger apparatus based, at least in part, on placement of the apparatus at the charge surface position, determining that the charge surface position is associated with control of at least one separate apparatus, determining at least one operational directive associated with control of the separate apparatus based, at least in part, on the determination that the charge surface position is associated with control of the separate apparatus, and causing sending of the operational directive to the separate apparatus.

One or more embodiments may provide an apparatus, a computer readable medium, a computer program product, and/or a non-transitory computer readable medium having means for determining that the apparatus is placed at a charge surface position on a charger apparatus, the charge surface position being a position of the apparatus on the charge surface of the charger apparatus, and the apparatus being configured to receive a charge signal from the charger apparatus based, at least in part, on placement of the apparatus at the charge surface position, means for determining that the charge surface position is associated with control of at least one separate apparatus, means for determining at least one operational directive associated with control of the separate apparatus based, at least in part, on the determination that the charge surface position is associated with control of the separate apparatus, and means for causing sending of the operational directive to the separate apparatus.

One or more example embodiments further perform determination that the apparatus has been placed on the charge surface of the charger apparatus, wherein the determination that the apparatus has been placed at the charge surface position on the charger apparatus is based, at least in part, on the determination that the apparatus has been placed on the charge surface.

In at least one example embodiment, the charge surface is a non-display surface.

In at least one example embodiment, the charge surface is a surface of the charger apparatus configured such that the apparatus may be placed on the surface in order to receive the charge signal from the charger apparatus.

In at least one example embodiment, the charger apparatus is a wireless charger apparatus.

In at least one example embodiment, the charge signal is a wireless charge signal.

In at least one example embodiment, the determination of the operational directive comprises causation of display of at least one operational directive interface element that is associated with an operational directive candidate, and receipt of information indicative of an operational directive candidate selection input associated with the operational directive interface element that identifies the operational directive candidate as the operational directive.

In at least one example embodiment, the determination of the operational directive comprises causation of display of at least one operational directive interface element that is associated with the operational directive, and receipt of information indicative of an operational directive selection input associated with the operational directive interface element.

In at least one example embodiment, the operational directive interface element is displayed at a display position on a display, and the operational directive selection input is at a position on the display that corresponds with the display position of the operational directive interface element.

In at least one example embodiment, the display of the operational directive interface element comprises display of the operational directive interface element such that the operational directive interface element transitions from a position to a different position such that the operational directive interface element is perceived by a user to move from the position to the different position.

In at least one example embodiment, the position is a non-display position, and the different position is a display position.

In at least one example embodiment, the determination that the apparatus has been placed at the charge surface position on the charger apparatus comprises receipt of information indicative of the charge surface position.

In at least one example embodiment, the information indicative of the charge surface position is based, at least in part, on sensor information associated with at least one of a near field communication sensor, a touch sensor, a motion sensor, a light sensor, or a charger utilization sensor.

In at least one example embodiment, the information indicative of the charge surface position is received from at least one sensor comprised by the apparatus.

In at least one example embodiment, the information indicative of the charge surface position is received from the charger apparatus.

In at least one example embodiment, the charge surface position is in a charge surface direction from a center of the charge surface of the charger apparatus, and the separate apparatus is in a separate apparatus direction from the charger apparatus such that the separate apparatus direction corresponds with the charge surface direction, wherein the determination that the charge surface position is associated with control of the separate apparatus is based, at least in part, on the correspondence between the separate apparatus direction and the charge surface direction.

In at least one example embodiment, the charge surface direction indicates a direction from the center of the charge surface of the charger apparatus to the charge surface position on the charge surface of the charger apparatus.

One or more example embodiments further perform determination of a spatial location of the separate apparatus, wherein the separate apparatus direction indicates a direction from a spatial location of the charger apparatus to the spatial location of the separate apparatus.

One or more example embodiments further perform determination that the separate apparatus direction corresponds with the charge surface direction.

In at least one example embodiment, the spatial location of the separate apparatus is a physical location of the separate apparatus in relation to the apparatus.

One or more example embodiments further perform determination of a predefined spatial region in which the separate apparatus is located, wherein the separate apparatus direction indicates a direction from a spatial location of the charger apparatus to the predefined spatial region.

One or more example embodiments further perform determination that the separate apparatus direction corresponds with the charge surface direction.

In at least one example embodiment, the predefined spatial region is at least a portion of the environment that surrounds the apparatus.

In at least one example embodiment, the predefined spatial region is at least one of an area, a room, or a building.

One or more example embodiments further perform causation of display of at least a portion of a predefined spatial region directional indication based, at least in part, on the determination of the predefined spatial region in which the separate apparatus is located.

In at least one example embodiment, the predefined spatial region directional indication comprises visual information indicative of the predefined spatial region and the separate apparatus direction.

One or more example embodiments further perform retrieval of information indicative of an associated between the predefined spatial region and the separate apparatus from a predefined spatial region-separate apparatus association correlation table, wherein the determination of the predefined spatial region in which the separate apparatus is located is based, at least in part, on the information indicative of the association between the predefined spatial region and the separate apparatus.

In at least one example embodiment, the charge surface position is associated with the predefined spatial region.

One or more example embodiments further perform retrieval of information indicative of an association between the charge surface position and the predefined spatial region from a charge surface position-predefined spatial region association correlation table, wherein the determination that the charge surface position is associated with control of the separate apparatus is based, at least in part, on the information indicative of the association between the charge surface position and the predefined spatial region.

One or more example embodiments further perform determination that the separate apparatus direction corresponds with the charge surface direction.

One or more example embodiments further perform determination that the charger apparatus has been reoriented, and determination that the charge surface position is associated with control of a different separate apparatus based, at least in part, on the determination that the charger apparatus has been reoriented.

One or more example embodiments further perform determination that a different charge surface position is associated with control of the separate apparatus.

One or more example embodiments further perform determination that the apparatus has been moved to the different charge surface position.

In at least one example embodiment, the determination that the charger apparatus has been reoriented comprises receipt of information indicative of reorientation of the charger apparatus, and determination that the charger apparatus has been reoriented based, at least in part, on the information indicative of reorientation of the charger apparatus.

In at least one example embodiment, the information indicative of reorientation of the charger apparatus is received from at least one sensor.

In at least one example embodiment, the sensor is at least one of a motion sensor, an orientation sensor, an accelerometer sensor, a compass sensor, or a location sensor.

In at least one example embodiment, the sensor is comprised by the apparatus.

In at least one example embodiment, the information indicative of reorientation of the charger apparatus is received from the charger apparatus.

In at least one example embodiment, the information indicative of reorientation of the charger apparatus is received from a server.

In at least one example embodiment, the separate apparatus is within a predefined spatial region in which the charger apparatus is located, and the charge surface position is within a center region of the charger apparatus.

One or more example embodiments further perform determination that the apparatus has been moved to a different charge surface position on the charger apparatus, and determination that the different charge surface position is associated with control of at least one different separate apparatus.

One or more example embodiments further perform determination of at least another operational directive associated with control of the different separate apparatus based, at least in part, on the determination that the different charge surface position is associated with control of the different separate apparatus.

One or more example embodiments further perform causation of sending of the other operational directive to the different separate apparatus.

In at least one example embodiment, the determination of the other operational directive associated with control of the different separate apparatus comprises causation of display of at least one operational directive interface element that is associated with the other operational directive, and receipt of information indicative of an operational directive selection input associated with the operational directive interface element.

In at least one example embodiment, the other operational directive is different from the operational directive.

In at least one example embodiment, the other operational directive fails to correspond with the operational directive.

One or more example embodiments further perform receipt of information indicative of an operational directive copy input associated with the operational directive, wherein the determination of the other operational directive comprises determination of the other operational directive such that the other operational directive corresponds with the operational directive.

One or more example embodiments further perform receipt of information indicative of an operational directive copy input associated with the operational directive, wherein the determination of the other operational directive is based, at least in part, on the operational directive.

In at least one example embodiment, the operational directive is a directive that instructs the separate apparatus to perform a particular set of operations that are associated with the directive.

In at least one example embodiment, the operational directive identifies at least one operation of the set of operations.

In at least one example embodiment, the operational directive is a directive associated with selection of a media source.

In at least one example embodiment, the operational directive is a directive associated with rendering of a media item.

In at least one example embodiment, the operational directive is a directive associated with playing of an audio media item.

In at least one example embodiment, the operational directive is a directive associated with playing of a video media item.

In at least one example embodiment, the operational directive is a directive associated with setting of parameter.

In at least one example embodiment, the operational directive is a directive associated with setting of a light intensity parameter.

In at least one example embodiment, the operational directive is a directive associated with rendering of a media item.

In at least one example embodiment, the operational directive is a directive associated with a temperature parameter.

In at least one example embodiment, the operational directive is a directive associated with a fan speed parameter.

In at least one example embodiment, the operational directive is a directive associated with a lighting parameter.

In at least one example embodiment, the operational directive is a directive associated with a window shade adjustment parameter.

In at least one example embodiment, the operational directive is a directive associated with operation of a small appliance.

BRIEF DESCRIPTION OF THE DRAWINGS

For a more complete understanding of embodiments of the invention, reference is now made to the following descriptions taken in connection with the accompanying drawings in which:

FIG. 3 is a diagram illustrating an apparatus and a charger apparatus according to at least one example embodiment;

FIGS. 4A-4E are diagrams illustrating an apparatus at a charge surface position on a charger apparatus according to at least one example embodiment;

FIGS. 5A-5D are diagrams illustrating an association correlation table according to at least one example embodiment;

DETAILED DESCRIPTION OF THE DRAWINGS

Figure 1:
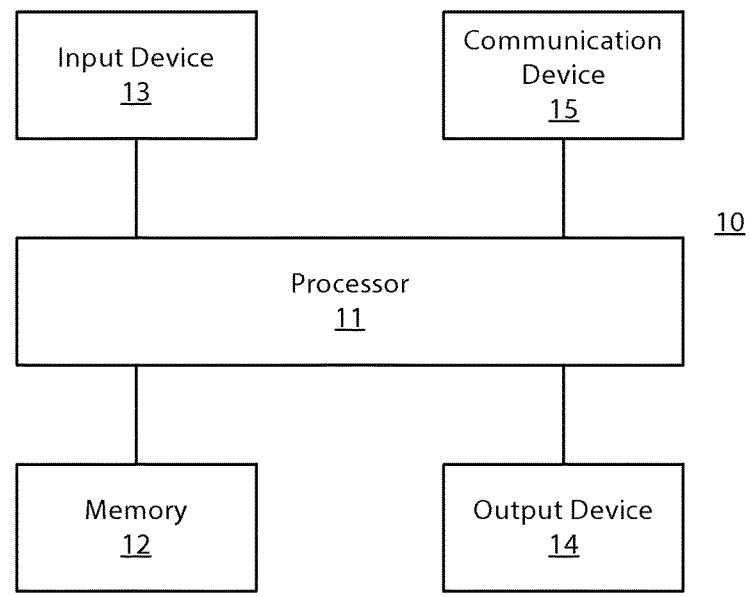
FIG. 1 is a block diagram showing an apparatus according to at least one example embodiment.

An embodiment of the invention and its potential advantages are understood by referring to FIGS. 1 through 10 of the drawings.

Some embodiments will now be described more fully hereinafter with reference to the accompanying drawings, in which some, but not all, embodiments are shown. Various embodiments of the invention may be embodied in many different forms and should not be construed as limited to the embodiments set forth herein; rather, these embodiments are provided so that this disclosure will satisfy applicable legal requirements. Like reference numerals refer to like elements throughout. As used herein, the terms "data," "content," "information," and similar terms may be used interchangeably to refer to data capable of being transmitted, received and/or stored in accordance with embodiments of the present invention. Thus, use of any such terms should not be taken to limit the spirit and scope of embodiments of the present invention.

Additionally, as used herein, the term 'circuitry' refers to (a) hardware-only circuit implementations (e.g., implementations in analog circuitry and/or digital circuitry); (b) combinations of circuits and computer program product(s) comprising software and/or firmware instructions stored on one or more computer readable memories that work together to cause an apparatus to perform one or more functions described herein; and (c) circuits, such as, for example, a microprocessor(s) or a portion of a microprocessor(s), that require software or firmware for operation even if the software or firmware is not physically present. This definition of 'circuitry' applies to all uses of this term herein, including in any claims. As a further example, as used herein, the term 'circuitry' also includes an implementation comprising one or more processors and/or portion(s) thereof and accompanying software and/or firmware. As another example, the term 'circuitry' as used herein also includes, for example, a baseband integrated circuit or applications processor integrated circuit for a mobile phone or a similar integrated circuit in a server, a cellular network apparatus, other network apparatus, and/or other computing apparatus.

As defined herein, a "non-transitory computer-readable medium," which refers to a physical medium (e.g., volatile or non-volatile memory device), can be differentiated from a "transitory computer-readable medium," which refers to an electromagnetic signal.

FIG. 1 is a block diagram showing an apparatus, such as an electronic apparatus 10, according to at least one example embodiment. It should be understood, however, that an electronic apparatus as illustrated and hereinafter described is merely illustrative of an electronic apparatus that could benefit from embodiments of the invention and, therefore, should not be taken to limit the scope of the invention. While electronic apparatus 10 is illustrated and will be hereinafter described for purposes of example, other types of electronic apparatuses may readily employ embodiments of the invention. Electronic apparatus 10 may be a personal digital assistant (PDAs), a pager, a mobile computer, a desktop computer, a television, a gaming apparatus, a laptop computer, a tablet computer, a media player, a camera, a video recorder, a mobile phone, a charger apparatus, a wireless charger apparatus, a global positioning system (GPS) apparatus, an automobile, a kiosk, an electronic table, and/or any other types of electronic systems. Moreover, the apparatus of at least one example embodiment need not be the entire electronic apparatus, but may be a component or group of components of the electronic apparatus in other example embodiments. For example, the apparatus may be an integrated circuit, a set of integrated circuits, and/or the like.

Furthermore, apparatuses may readily employ embodiments of the invention regardless of their intent to provide mobility. In this regard, even though embodiments of the invention may be described in conjunction with mobile applications, it should be understood that embodiments of the invention may be utilized in conjunction with a variety of other applications, both in the mobile communications industries and outside of the mobile communications industries. For example, the apparatus may be, at least part of, a non-carryable apparatus, such as a large screen television, an electronic table, a kiosk, an automobile, and/or the like.

In at least one example embodiment, electronic apparatus 10 comprises processor 11 and memory 12. Processor 11 may be any type of processor, controller, embedded controller, processor core, and/or the like. In at least one example embodiment, processor 11 utilizes computer program code to cause an apparatus to perform one or more actions. Memory 12 may comprise volatile memory, such as volatile Random Access Memory (RAM) including a cache area for the temporary storage of data and/or other memory, for example, non-volatile memory, which may be embedded and/or may be removable. The non-volatile memory may comprise an EEPROM, flash memory and/or the like. Memory 12 may store any of a number of pieces of information, and data. The information and data may be used by the electronic apparatus 10 to implement one or more functions of the electronic apparatus 10, such as the functions described herein. In at least one example embodiment, memory 12 includes computer program code such that the memory and the computer program code are configured to, working with the processor, cause the apparatus to perform one or more actions described herein.

The electronic apparatus 10 may further comprise a communication device 15. In at least one example embodiment, communication device 15 comprises an antenna, (or multiple antennae), a wired connector, and/or the like in operable communication with a transmitter and/or a receiver. In at least one example embodiment, processor 11 provides signals to a transmitter and/or receives signals from a receiver. The signals may comprise signaling information in accordance with a communications interface standard, user speech, received data, user generated data, and/or the like. Communication device 15 may operate with one or more air interface standards, communication protocols, modulation types, and access types. By way of illustration, the electronic communication device 15 may operate in accordance with second-generation (2G) wireless communication protocols IS-136 (time division multiple access (TDMA)), Global System for Mobile communications (GSM), and IS-95 (code division multiple access (CDMA)), with third-generation (3G) wireless communication protocols, such as Universal Mobile Telecommunications System (UMTS), CDMA2000, wideband CDMA (WCDMA) and time division-synchronous CDMA (TD-SCDMA), and/or with fourth-generation (4G) wireless communication protocols, wireless networking protocols, such as 802.11, short-range wireless protocols, such as Bluetooth, and/or the like. Communication device 15 may operate in accordance with wireline protocols, such as Ethernet, digital subscriber line (DSL), asynchronous transfer mode (ATM), and/or the like.

Processor 11 may comprise means, such as circuitry, for implementing audio, video, communication, navigation, logic functions, and/or the like, as well as for implementing embodiments of the invention including, for example, one or more of the functions described herein. For example, processor 11 may comprise means, such as a digital signal processor device, a microprocessor device, various analog to digital converters, digital to analog converters, processing circuitry and other support circuits, for performing various functions including, for example, one or more of the functions described herein. The apparatus may perform control and signal processing functions of the electronic apparatus 10 among these devices according to their respective capabilities. The processor 11 thus may comprise the functionality to encode and interleave message and data prior to modulation and transmission. The processor 1 may additionally comprise an internal voice coder, and may comprise an internal data modem. Further, the processor 11 may comprise functionality to operate one or more software programs, which may be stored in memory and which may, among other things, cause the processor 11 to implement at least one embodiment including, for example, one or more of the functions described herein. For example, the processor 11 may operate a connectivity program, such as a conventional internet browser. The connectivity program may allow the electronic apparatus 10 to transmit and receive internet content, such as location-based content and/or other web page content, according to a Transmission Control Protocol (TCP), Internet Protocol (IP), User Datagram Protocol (UDP), Internet Message Access Protocol (IMAP), Post Office Protocol (POP), Simple Mail Transfer Protocol (SMTP), Wireless Application Protocol (WAP), Hypertext Transfer Protocol (HTTP), and/or the like, for example.

The electronic apparatus 10 may comprise a user interface for providing output and/or receiving input. The electronic apparatus 10 may comprise an output device 14. Output device 14 may comprise an audio output device, such as a ringer, an earphone, a speaker, and/or the like. Output device 14 may comprise a tactile output device, such as a vibration transducer, an electronically deformable surface, an electronically deformable structure, and/or the like. Output device 14 may comprise a visual output device, such as a display, a light, and/or the like. In at least one example embodiment, the apparatus causes display of information, the causation of display may comprise displaying the information on a display comprised by the apparatus, sending the information to a separate apparatus that comprises a display, and/or the like. The electronic apparatus may comprise an input device 13. Input device 13 may comprise a light sensor, a proximity sensor, a microphone, a touch sensor, a force sensor, a button, a keypad, a motion sensor, a magnetic field sensor, a camera, and/or the like. A touch sensor and a display may be characterized as a touch display. In an embodiment comprising a touch display, the touch display may be configured to receive input from a single point of contact, multiple points of contact, and/or the like. In such an embodiment, the touch display and/or the processor may determine input based, at least in part, on position, motion, speed, contact area, and/or the like. In at least one example embodiment, the apparatus receives an indication of an input. The apparatus may receive the indication from a sensor, a driver, a separate apparatus, and/or the like. The information indicative of the input may comprise information that conveys information indicative of the input, indicative of an aspect of the input indicative of occurrence of the input, and/or the like.

The electronic apparatus 10 may include any of a variety of touch displays including those that are configured to enable touch recognition by any of resistive, capacitive, infrared, strain gauge, surface wave, optical imaging, dispersive signal technology, acoustic pulse recognition or other techniques, and to then provide signals indicative of the location and other parameters associated with the touch. Additionally, the touch display may be configured to receive an indication of an input in the form of a touch event which may be defined as an actual physical contact between a selection object (e.g., a finger, stylus, pen, pencil, or other pointing device) and the touch display. Alternatively, a touch event may be defined as bringing the selection object in proximity to the touch display, hovering over a displayed object or approaching an object within a predefined distance, even though physical contact is not made with the touch display. As such, a touch input may comprise any input that is detected by a touch display including touch events that involve actual physical contact and touch events that do not involve physical contact but that are otherwise detected by the touch display, such as a result of the proximity of the selection object to the touch display. A touch display may be capable of receiving information associated with force applied to the touch screen in relation to the touch input. For example, the touch screen may differentiate between a heavy press touch input and a light press touch input. In at least one example embodiment, a display may display two-dimensional information, three-dimensional information and/or the like.

In embodiments including a keypad, the keypad may comprise numeric (for example, 0-9) keys, symbol keys (for example, #, *), alphabetic keys, and/or the like for operating the electronic apparatus 10. For example, the keypad may comprise a conventional QWERTY keypad arrangement. The keypad may also comprise various soft keys with associated functions. In addition, or alternatively, the electronic apparatus 10 may comprise an interface device such as a joystick or other user input interface.

Input device 13 may comprise a media capturing element. The media capturing element may be any means for capturing an image, video, and/or audio for storage, display or transmission. For example, in at least one example embodiment in which the media capturing element is a camera module, the camera module may comprise a digital camera which may form a digital image file from a captured image. As such, the camera module may comprise hardware, such as a lens or other optical component(s), and/or software necessary for creating a digital image file from a captured image. Alternatively, the camera module may comprise only the hardware for viewing an image, while a memory device of the electronic apparatus 10 stores instructions for execution by the processor 11 in the form of software for creating a digital image file from a captured image. In at least one example embodiment, the camera module may further comprise a processing element such as a co-processor that assists the processor 11 in processing image data and an encoder and/or decoder for compressing and/or decompressing image data. The encoder and/or decoder may encode and/or decode according to a standard format, for example, a Joint Photographic Experts Group (JPEG) standard format.

Figure 2:
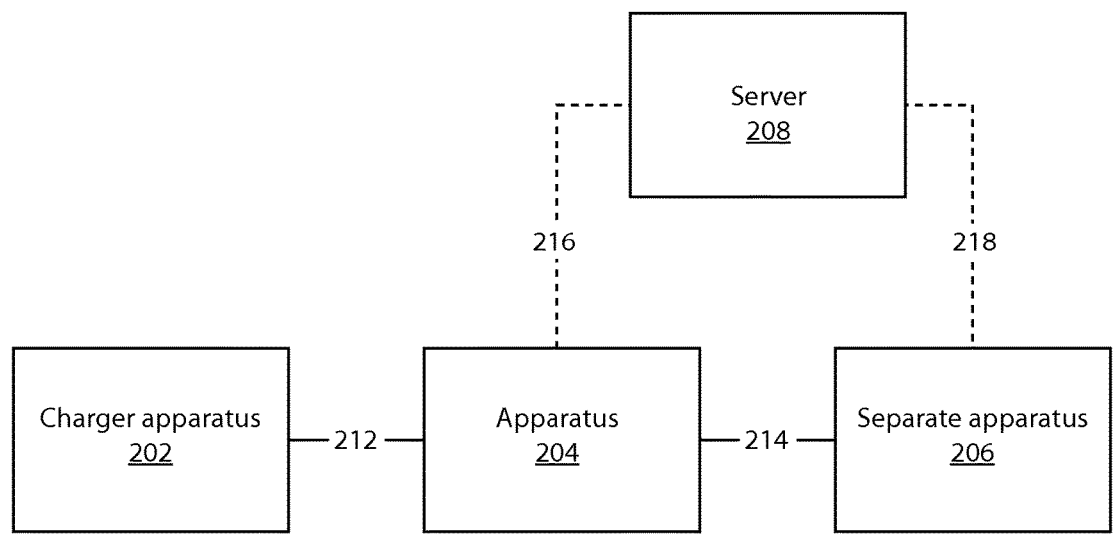
FIG. 2 is a block diagram illustrating apparatus communication according to at least one example embodiment.

FIG. 2 is a diagram illustrating apparatus communication according to at least one example embodiment. The example of FIG. 2 is merely an example and does not limit the scope of the claims. For example, communication paths may vary, apparatus count may vary, server count may vary, separate apparatus count may vary, charger apparatus count may vary, apparatus, server, separate apparatus, and/or charger apparatus designations may vary, apparatus, server, separate apparatus, and/or charger apparatus configuration may vary, and/or the like.

In many circumstances, a user may desire to utilize one or more electronic apparatuses in conjunctions with one another. In such circumstances, it may be desirable to allow for interoperability amongst such electronic apparatuses, communication between the electronic apparatuses, and/or the like. The example of FIG. 2 depicts charger apparatus 202 in communication with apparatus 204 by way of communication channel 212, and apparatus 204 in communication with separate apparatus 206 by way of communication channel 214. Charger apparatus 202 is a wireless charger apparatus, similar as may be described regarding FIG. 3. The example of FIG. 2 also depicts server 208 in communication with apparatus 204 by way of communication channel 216 and with separate apparatus 206 by way of communication channel 218. In the example of FIG. 2, apparatus 204 may indirectly communicate with separate apparatus 206 via server 208 by way of communication channels 216 and 218, and separate apparatus 206 may indirectly communicate with apparatus 204 via server 208 by way of communication channels 218 and 216. For example, apparatus 204 may cause sending of information to server 208 by way of communication channel 216, and server 208 may forward the information from apparatus 204 to separate apparatus 206 by way of communication channel 218. Similarly, server 208 may receive information from separate apparatus 206 by way of apparatus 218. In such an example, server 208 may receive the information from separate apparatus 206, and may forward the information from separate apparatus 206 to apparatus 204. Additionally, apparatus 204 and/or separate apparatus 206 may receive information from server 208 by way of communication channels 216 and/or 218, respectively. In such an example, apparatus 204 and/or separate apparatus 206 may forward the information received from server 208 to each other, to charger apparatus 202, to a different separate apparatus, and/or the like. In at least one example embodiment, server 208 is in communication with charger apparatus 202 by way of apparatus 204, via communication channels 216 and 212. In at least one example embodiment, separate apparatus 206 is in communication with charger apparatus 202 by way of apparatus 204, via communication channels 214 and 212. Although the example of FIG. 2 fails to indicate a direct communication channel between server 208 and charger apparatus 202, in at least one example embodiment, server 208 and charger apparatus 202 communicate by way of a direct communication channel.

It should be understood that, even though FIG. 2 illustrates a direct communication channel between charger apparatus 202 and apparatus 204, between apparatus 204 and separate apparatus 206, between server 208 and apparatus 204, and between server 208 and separate apparatus 206, there may be intermediate apparatuses that facilitate communication between charger apparatus 202 and apparatus 204, between apparatus 204 and separate apparatus 206, between server 208 and apparatus 204, and/or between server 208 and separate apparatus 206. For example, there may be one or more routers, hubs, switches, gateways, and/or the like, that are utilized in the communication channels between charger apparatus 202 and apparatus 204, between apparatus 204 and separate apparatus 206, between server 208 and apparatus 204, and/or between server 208 and separate apparatus 206. In addition, there may be other separate apparatuses that charger apparatus 202, apparatus 204, separate apparatus 206, and/or server 208 are in communication with. For example, charger apparatus 202, apparatus 204, separate apparatus 206, and/or server 208 may be in communication with another apparatus, another separate apparatus, another charger apparatus, another server, a different separate apparatus, a different charger apparatus, a different server, and/or the like.

In some circumstances, a user may desire to have collaboration between apparatuses, such as between an apparatus and a separate apparatus, based on their proximity with each other. For example, it may be intuitive for a user to manage collaboration between apparatuses that are local to each other. A plurality of apparatuses may be proximate to each other based on location, availability of local communication among the apparatuses, and/or the like. For example, if the apparatuses collaborate by way of low power radio frequency communication, a radio frequency communication, near field communication, inductive communication, electric field communication, Bluetooth communication, infrared communication, local area network communication, wireless local area network communication, and/or the like, the apparatuses may be considered to be proximate with each other based, at least in part, on availability of such proximity-based communication with each other. In at least one example embodiment, apparatuses include electronic apparatuses, peripheral apparatuses, host apparatus, and/or the like. In at least one example embodiment, apparatuses communicate with each other. For example, an apparatus may be an apparatus that automatically communicates with another apparatus for purposes such as identifying the apparatus, synchronizing data, exchanging status information, and/or the like. In at least one example embodiment, an apparatus retains information associated with communication with a separate apparatus. For example the apparatus may comprise information associated with identifying, communicating with, authenticating, performing authentication with, and/or the like, the separate apparatus. In this manner, the apparatus may be privileged to perform operations in conjunction with the separate apparatus that a different apparatus may lack the privilege to perform.

In at least one example embodiment, communication based, at least in part, on short range communication is referred to as proximity-based communication. In at least one example embodiment, proximity-based communication relates to wireless communication that is associated with a short range, such as low power radio frequency communication, radio frequency communication, near field communication, inductive communication, electric field communication, Bluetooth communication, infrared communication, local area network communication, wireless local area network communication, and/or the like. In such an example, the exchange of information may be by way of the short range wireless communication between the apparatus and a separate apparatus, host apparatus, and/or the like.

In at least one example embodiment, a proximity-based communication channel is a low power radio frequency communication channel, a radio frequency communication channel, a near field communication channel, a wireless communication channel, a wireless local area network communication channel, a Bluetooth communication channel, an electric field communication channel, an inductive communication channel, an infrared communication channel, and/or the like. For example, as depicted in FIG. 2, charger apparatus 202 communicates with apparatus 204 by way of a communication channel 212. In the example of FIG. 2, communication channel 212 may be a low power radio frequency communication channel, a radio frequency communication channel, a near field communication channel, a wireless communication channel, a wireless local area network communication channel, a Bluetooth communication channel, an electric field communication channel, an inductive communication channel, an infrared communication channel, and/or the like. Similarly, as depicted in FIG. 2, apparatus 204 communicates with separate apparatus 206 by way of communication channel 214. In the example of FIG. 2, communication channel 214 may be a low power radio frequency communication channel, a radio frequency communication channel, a near field communication channel, a wireless communication channel, a wireless local area network communication channel, a Bluetooth communication channel, an electric field communication channel, an inductive communication channel, an infrared communication channel, and/or the like.

In at least one example embodiment, an apparatus and a separate apparatus communicate by way of non-proximity-based communication channels. For example, as depicted in FIG. 2, apparatus 204 communicates with server 208 by way of a communication channel 216. In the example of FIG. 2, communication channel 216 may be a local area network communication channel, a wide area network communication channel, an internet communication channel, a cellular communication channel, and/or the like. Similarly, as depicted in FIG. 2, separate apparatus 206 communicates with server 208 by way of communication channel 218. In the example of FIG. 2, communication channel 218 may be a local area network communication channel, a wide area network communication channel, an internet communication channel, a cellular communication channel, and/or the like.

FIG. 3 is a diagram illustrating an apparatus and a charger apparatus according to at least one example embodiment. The example of FIG. 3 is merely an example and does not limit the scope of the claims. For example, apparatus design may vary, charger apparatus design may vary, charger apparatus configuration may vary, charger apparatus dimensions may vary, and/or the like.

As electronic apparatuses become increasingly prevalent and pervasive in our society, users of such electronic apparatuses have become accustomed to interacting with their electronic apparatuses throughout the day. Additionally, as technology has developed, electronic apparatuses have become increasing robust, powerful, etc. As such, in many circumstances, a user may desire to charge the user's electronic apparatus after extended use of the electronic apparatus. For example, the user may charge the electronic apparatus by way of a charger apparatus. A charger apparatus may be a power supply unit, a dock apparatus, and/or the like. In at least one example embodiment, a charger apparatus is an apparatus associated with providing power to an apparatus. The charger apparatus may be a specialized apparatus designed for performance of charging. For example, the charger apparatus may lack user interaction devices, such as a display, a touch sensor, a keypad, and/or the like. In such an example, the charger apparatus may comprise sensors associated with detection of an apparatus to be charged absent such user interaction devices.

In one or more example embodiments, provision of power from the charger apparatus to the apparatus is effected by way of a connection between the apparatus and the charger apparatus. In such an example embodiment, the charger apparatus may be a wired charger apparatus, and the connection between the apparatus and the charger apparatus may be a wired connection. In at least one example embodiment, an apparatus is charged by way of a charge signal received from the charger apparatus.

In some circumstances, a user may desire to cause charging of the user's electronic apparatus in a manner that is quick and easy. For example, the user may desire to cause charging of the electronic apparatus in a manner which avoids having to fumble with cumbersome wired connections between the electronic apparatus and the charger apparatus, which allows for quick and convenient charging and subsequent use, and/or the like. In at least one example embodiment, a charger apparatus is a wireless charger apparatus. In such an example embodiment, the connection between the apparatus and the charger apparatus is a wireless connection. In at least one example embodiment, a charge signal is a wireless charge signal. In such an example embodiment, the apparatus may be charged by way of the wireless charge signal received from the charger apparatus. For example, the wireless charge signal may be an inductive charge signal, an electronic field charge signal, and/or the like. In at least one example embodiment, an apparatus is charged by placing the apparatus on a charge surface of a charger apparatus. The charge surface may be a surface of the charger apparatus configured such that the apparatus may be placed on the surface in order to receive a charge signal from the charger apparatus. For example, the charger apparatus may comprise one or more inductive charge coils situated in proximity to the charge surface such that an apparatus placed on the charge surface is caused to be charged.

In many circumstances, a user's view of a charge surface of a charger apparatus may be obstructed when the user places the user's electronic apparatus onto the charge surface. As such, in at least one example embodiment, a charge surface is a non-display surface. For example, the charge surface may fail to comprise an alphanumeric display, a graphical display, and/or the like.

In many circumstances, it may be desirable to tie the charging of an electronic apparatus to certain charging operations, non-charging operations, and/or the like. For example, placement of an apparatus at a certain position on a charge surface of a charger apparatus may initiate charger of the apparatus, may influence charging of the apparatus, and/or the like. For example, a charger apparatus may comprise a plurality of inductive charge coils that are evenly distributed across the charge surface. In such an example, placement of an apparatus to one side of the charge surface may cause charging of the apparatus by way of the inductive charge coils proximate to the apparatus, and may preclude charging of the apparatus by way of different inductive charge coils that may fail to be proximate to the apparatus. In such an example, an inductive charge coil may be proximate to the apparatus if the apparatus is within an inductive charge threshold distance from the inductive charge coil, if the apparatus may receive a charge signal from the indicative charge coil, and/or the like. In another example, a charger apparatus may comprise one or more inductive charge coils configured such that the inductive charge coils are moved to a position that corresponds with a position of an apparatus on a charge surface. In such an example, an apparatus may be placed at a particular position on a charge surface of a charger apparatus. In such an example, one or more inductive charge coil may be moved such that the position of the inductive charge coil corresponds with the particular position of the charge surface of the charger apparatus such that the apparatus may be charged by way of the inductive charge coil.

As such, in at least one example embodiment, an apparatus determines that the apparatus is placed at a charge surface position on a charger apparatus. In such an example embodiment, the charge surface position may be a position of the apparatus on the charge surface of the charger apparatus. In such an example embodiment, the apparatus may be configured to receive a charge signal from the charger apparatus based, at least in part, on placement of the apparatus at the charge surface position. In at least one example embodiment, an apparatus determines that the apparatus has been placed on the charge surface of the charger apparatus. In such an example embodiment, the determination that the apparatus has been placed at the charge surface position on the charger apparatus may be based, at least in part, on the determination that the apparatus has been placed on the charge surface.

The determination that the apparatus has been placed at the charge surface position on the charger apparatus may comprise receipt of information indicative of the charge surface position. In at least one example embodiment, the information indicative of the charge surface position is based, at least in part, on sensor information. The sensor information may be received from one or more sensors comprised by the apparatus, the charger apparatus, and/or the like. The sensor information may be received from a near field communication sensor, a touch sensor, a motion sensor, a light sensor, a charger utilization sensor, and/or the like. For example, the apparatus may receive a charge signal by way of a specific inductive charge coil that is located at a known position with respect to the charger apparatus. In such an example, the apparatus may determine a charge surface position associated with the apparatus based, at least in part, on sensor information received from a charger utilization sensor associated with the charger apparatus, the specific inductive charge coil, and/or the like. In another example, the charger apparatus may comprise an array of near field communication sensors distributed in relation to the charge surface of the charger apparatus. In such an example, the charge surface position of the apparatus on the charge surface of the charger apparatus may be based, at least in part, on sensor information received from a specific near field communication sensor that indicates that the apparatus is proximate to the specific near field communication sensor, is at a particular charge surface position, and/or the like.

FIG. 3 is a diagram illustrating an apparatus and a charger apparatus according to at least one example embodiment. In the example of FIG. 3, apparatus 302 is being charged by charger apparatus 304 via a charge signal. In the example of FIG. 3, charger apparatus 304 is a wireless charger apparatus, and the charge signal is a wireless charge signal. In the example of FIG. 3, apparatus 302 is positioned at a charge surface position on a charge surface of charger apparatus 304. In this manner, apparatus 302 may determine the charge surface position based, at least in part, on sensor information received from one or more sensors comprised by apparatus 302, charger apparatus 304, and/or the like. For example, charger apparatus 304 may comprise one or more light sensors distributed across the charge surface of charger apparatus 304. In such an example, placement of apparatus 302 on the charge surface of charger apparatus 304 may obstruct and/or affect the amount of light detected by one or the light sensors, by more than one light sensor, and/or the like. As such, the determination of the charge surface position of apparatus 302 on the charge surface of charger apparatus 304 may be based, at least in part, on sensor information received from charger apparatus 304 that is indicative of the charge surface position, apparatus 302 covering one or more light sensors, and/or the like.

As can be seen in the example of FIG. 3, although charger apparatus 304 is a wireless charger apparatus, charger apparatus 304 is connected to a power source by way of wired connection 306. In this manner, the wireless descriptor of charger apparatus 304 may characterize the wireless connection between charger apparatus 304 and apparatus 302, the wireless charge signal that may cause apparatus 302 to charge, and/or the like.

FIGS. 4A-4E are diagrams illustrating an apparatus at a charge surface position on a charger apparatus according to at least one example embodiment. The examples of FIGS. 4A-4E are merely examples and do not limit the scope of the claims. For example, apparatus design may vary, charger apparatus design may vary, display content may vary, apparatus orientation may vary, charger apparatus configuration may vary, charger apparatus dimensions may vary, and/or the like.

As previously discussed, many users utilize their electronic apparatuses in numerous and varied manners. For example, a user may utilize her electronic apparatus to listen to music, to view a video, to interact with the environment surrounding the user, and/or the like. As electronic apparatuses have become increasingly prevalent and pervasive, many users utilize more than one electronic apparatus in conjunction with one another. For example, a user may desire to cause playing of the music by way of a different electronic apparatus that may comprise one or more high fidelity speakers. In another example, the user may desire to view a video by way of another electronic apparatus that may comprise a large, high resolution display. In this manner, it may be desirable to configure an electronic apparatus such that a user of the electronic apparatus may to interact with a different electronic apparatus, to control another electronic apparatus, and/or the like, in a manner that is easy to understand and intuitive.

In many circumstances, a user may desire to control a specific electronic apparatus based, at least in part, on a location of the specific electronic apparatus. For example, a user may desire to cause the specific electronic apparatus to play music based, at least in part, on the specific electronic apparatus being located in the same room as the user. As such, it may be desirable to configure an electronic apparatus such that the user of the electronic apparatus may indicate a desire to interact with another electronic apparatus based, at least in part, on indicating a general location of the other electronic apparatus, a direction to the other electronic apparatus, and/or the like. As discussed previously, often times, an electronic apparatus may be located on a charge surface of a charger apparatus. In such circumstances, it may be desirable to allow the user of the electronic apparatus to indicate a general location of the other electronic apparatus, a direction to the other electronic apparatus, and/or the like, by way of the placement of the apparatus on the charge surface, the charge surface position of the electronic apparatus on the charge surface, and/or the like. For example, placement of an electronic apparatus towards a specific edge of the charge surface may indicate that the user desires to interact with another electronic apparatus that is located in a direction away from that specific edge. In at least one example embodiment, an apparatus determines that a charge surface position is associated with control of at least one separate apparatus. In this manner, a charge surface of a charger apparatus may be mapped such that the charge surface is representative of the spatial surrounds of the charger apparatus, the electronic apparatus, the user, and/or the like.

In many circumstances, a user may desire to control a separate electronic apparatus that is situated near the user, proximate to the charger apparatus, in the same room as the electronic apparatus, and/or the like. As such, it may be desirable to allow a user to indicate the user's desire to control the separate electronic apparatus in a manner that is easy and intuitive for the user. In at least one example embodiment, a charge surface position is within a center region of a charge surface of a charger apparatus. In such an example, the charge surface position may indicate that the separate apparatus is within a predefined spatial region in which the charger apparatus is located. The predefined spatial region may be at least a portion of the environment that surrounds the apparatus. For example, the predefined spatial region may be a predefined area, a room, a building, and/or the like. In this manner, a charge surface position that is within a center region of a charge surface may be associated with control of a separate apparatus that is located within the same room as the apparatus, proximate to the charger apparatus, and/or the like. In at least one example embodiment, an apparatus causes display of at least a portion of a predefined spatial region locational indication. In such an example embodiment, the predefined spatial region locational indication may indicate a specific predefined spatial region associated with the charge surface position at which the apparatus is placed, may identify a room in which the separate apparatus is located, and/or the like. Causation of display of the predefined spatial region locational indication may comprise display of the predefined spatial region locational indication on a display comprised by the apparatus, causation of display of the predefined spatial region locational indication on a display comprised by a separate apparatus, sending of information indicative of the predefined spatial region locational indication to a separate apparatus such that the separate apparatus is caused to display the predefined spatial region locational indication, and/or the like. The association between the charge surface position and the predefined spatial region may be predetermined, may be user definable, and/or the like. For example, an apparatus may be configured such that a user may configure an association between a particular portion of the charge surface, a particular charge surface position, etc. and a specific predefined spatial region. In such an example, the user may configure the association by way of one or more interface elements, such as a menu, a map-based configuration interface, and/or the like, such that placing an apparatus at the user defined charge surface position indicates a desire to interact with a separate apparatus located within the associated predefined spatial region.

Figures 4A, 4B:
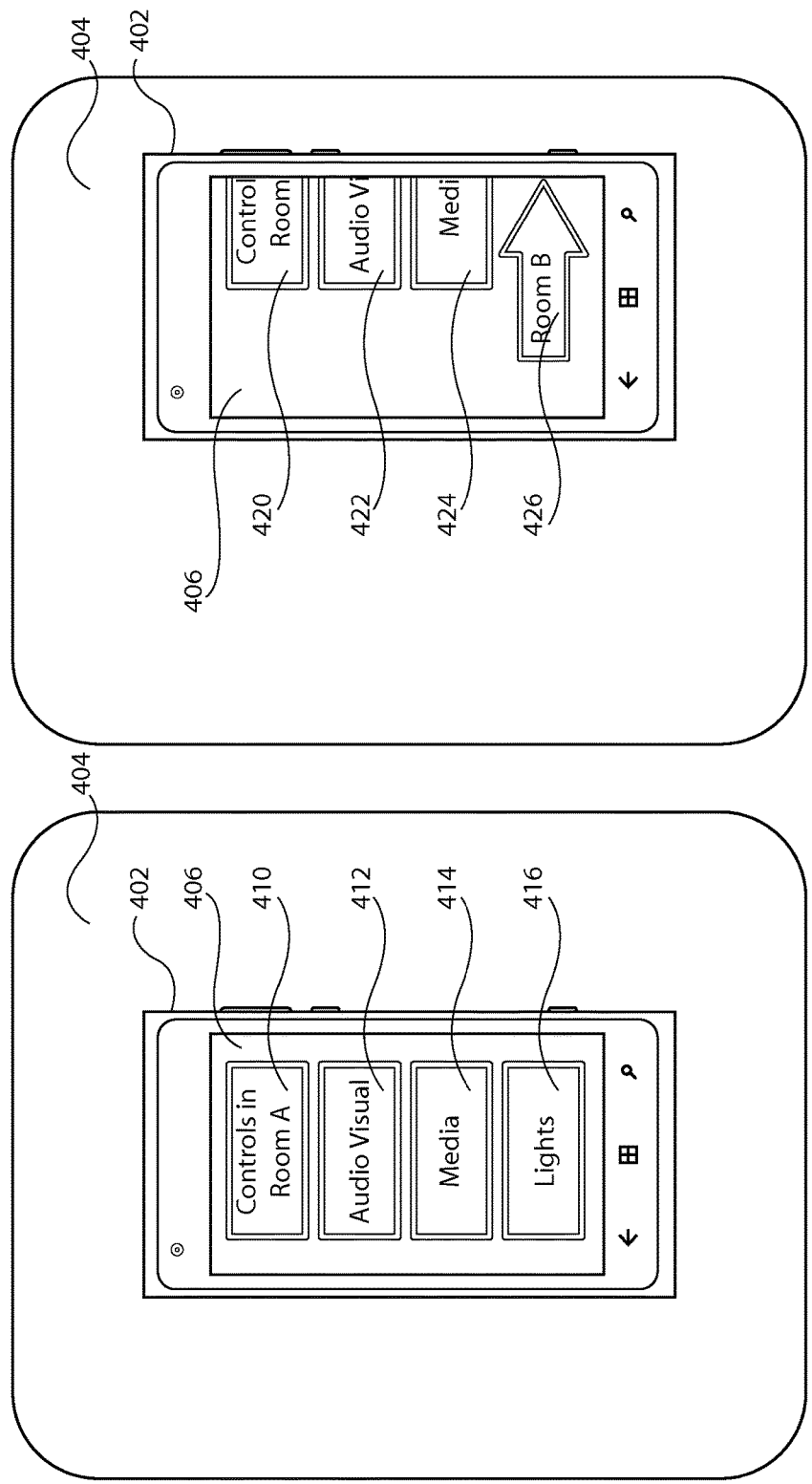

FIG. 4A is a diagram illustrating an apparatus at a charge surface position on a charger apparatus according to at least one example embodiment. In the example of FIG. 4A, apparatus 402 is positioned at a charge surface position on the charge surface of charger apparatus 404. In the example of FIG. 4A, apparatus 402 and charger apparatus 404 are located in a predefined spatial region "room A", as indicated by predefined spatial region locational indication 410. Predefined spatial region locational indication 410 indicates that placement of apparatus 402 at a charge surface position associated with the center region of the charge surface is associated with control of one or more separate apparatuses located within the indicated predefined spatial region. As illustrated, the apparatus 402 is positioned approximately at the center of the charge surface of charger apparatus 404. In this manner, the charge surface position of apparatus 402 on charger apparatus 404 is within a center region of the charge surface of charger apparatus 404. As such, placement of apparatus 402 at the charge surface position illustrated in the example of FIG. 4A may indicate that a user of apparatus 402 desires to control one or more apparatus that may be located within the same predefined spatial region that apparatus 402 and charger apparatus 404 are located.

In many circumstances, a user may desire to control a separate electronic apparatus that is situated in a different room than the user, in a particular direction from the user, in a room that is adjacent to the room that the user is located in, and/or the like. As such, it may be desirable to allow a user to indicate the user's desire to control the separate electronic apparatus in a manner that is easy and intuitive for the user. For example, it may be desirable to allow the user to indicate a desire to control a particular separate apparatus by way of indicating the approximate location of the separate apparatus, a direction to the separate apparatus, and/or the like.

For example, the user may be facing a charger apparatus, and may desire to control a separate apparatus that is located to the left of the user. In such an example, the user may indicate such a desire to control the separate apparatus that is located to the left of the user by placing the user's electronic apparatus on the left side of the charger apparatus, sliding the electronic apparatus towards the left side of the charger apparatus, and/or the like. In at least one example embodiment, a charge surface position is in a charge surface direction from a center of the charge surface of the charger apparatus, and a separate apparatus is in a separate apparatus direction from the charger apparatus such that the separate apparatus direction corresponds with the charge surface direction. In at least one example embodiment, the charge surface direction indicates a direction from the center of the charge surface of the charger apparatus to the charge surface position on the charge surface of the charger apparatus. In at least one example embodiment, an apparatus determines spatial location of a separate apparatus. The spatial location of the separate apparatus may be a physical location of the separate apparatus in relation to the apparatus. In such an example embodiment, a separate apparatus direction may indicate a direction from the spatial location of the charger apparatus to the spatial location of the separate apparatus.

In such an example embodiment, the apparatus may determine that the charge surface position is associated with control of the separate apparatus based, at least in part, on the correspondence between the separate apparatus direction and the charge surface direction. In at least one example embodiment, an apparatus determines that a separate apparatus direction corresponds with a charge surface direction. For example, the separate apparatus direction and the charge surface direction may be determined to correspond if the charge surface direction is within an orientation difference threshold from the separate apparatus direction, the separate apparatus direction is within an orientation difference threshold from the charge surface direction, and/or the like. For example, the apparatus may determine that the charge surface direction and the separate apparatus direction correspond based, at least in part, on the charge surface direction being 5-degrees from the separate apparatus direction, being within 30-degrees from the separate apparatus direction, and/or the like.

As discussed previously, in many circumstances, a user may desire to interact with a separate apparatus that may be located in a room other than the room in which the user is in, in which the user's electronic apparatus is located, and/or the like. As such, in order to facilitate identification of a particular separate apparatus by way of an indication that identifies a direction in which the separate apparatus is located, it may be desirable to identify a location of the separate apparatus, a room in which the separate apparatus is located, and/or the like. In at least one example embodiment, an apparatus determines a predefined spatial region in which the separate apparatus is located. In such an example embodiment, the separate apparatus direction may indicate a direction from a spatial location of the charger apparatus to the predefined spatial region. The determination of the predefined spatial region in which the separate apparatus is located may be similar as described regarding FIGS. 5A-5D.

FIG. 4B is a diagram illustrating an apparatus at a charge surface position on a charger apparatus according to at least one example embodiment. The example of FIG. 4B illustrates the example of FIG. 4A subsequent to moving of apparatus 402 from the center of charger apparatus 404 towards the right edge of charger apparatus 404. In the example of FIG. 4B, apparatus 402 is positioned at a charge surface position on the charge surface of charger apparatus 404. As illustrated, the charge surface position of apparatus 402 is towards the right side of charger apparatus 404.

In some circumstances, it may be desirable for an electronic apparatus to cause display of an indication that identifies a direction of a particular room, a visual representation of a separate apparatus direction, and/or the like, such that a user of the electronic apparatus may quickly and easily determine the implications of the user's positioning of the electronic apparatus on the charge surface of a charger apparatus. For example, the user may desire to perceive visual information that verifies that the user is indicating a desire to control a particular separate apparatus, to control a separate apparatus that is located in a particular predefined spatial region, and/or the like. In at least one example embodiment, an apparatus causes display of at least a portion of a predefined spatial region directional indication. The display of the predefined spatial region directional indication may be based, at least in part, on the determination of the predefined spatial region in which the separate apparatus is located. The predefined spatial region directional indication may comprise visual information indicative of the predefined spatial region and the separate apparatus direction. As can be seen in the example of FIG. 4B, predefined spatial region directional indication 426 indicates that a predefined spatial region directional indication identified as "Room B" is in the direction that is indicated by the arrow. In this manner, as a user of apparatus 402 begins to slide apparatus 402 from the charge surface position shown in the example of FIG. 4A to the charge surface position shown in the example of FIG. 4B, predefined spatial region directional indication 426 indicates to the user that the user is moving apparatus 402 towards a charge surface position that is associated with control of separate apparatuses located within "Room B".

As discussed previously, in many circumstances, a user may desire to interact with and/or control one or more separate electronic apparatuses by way of an electronic apparatus and a charger apparatus. As such, it may be desirable to configure an electronic apparatus such that the electronic apparatus may communicate with a separate electronic apparatus, may cause the separate apparatus to perform one or more operations, and/or the like. In at least one example embodiment, an apparatus determines at least one operational directive associated with control of the separate apparatus. In such an example embodiment, the determination of the operational directive may be based, at least in part, on the determination that the charge surface position is associated with control of the separate apparatus. In at least one example embodiment, an operational directive is a directive that instructs a separate apparatus to perform a particular set of operations that are associated with the directive. In at least one example embodiment, an operational directive identifies at least one operation of the set of operations. For example, the operational directive may be a directive associated with selection of a media source. In such an example, a user may desire to stream music from a server, play a song that may be stored locally on the apparatus, and/or the like. In another example, the operational directive may be a directive associated with rendering of a media item. In such an example, the user may desire to cause playing of an audio media item, playing of a video media item, and/or the like. In at least one example embodiment, the operational directive is a directive that is associated with setting of a parameter. For example, a user may desire to control a separate apparatus that is associated with a home automation system, a parameter that is associated with playback of audio, and/or the like. In such an example, the operational directive may be a directive associated with setting of a light intensity parameter, setting of a curtain position parameter, setting of a rendering volume parameter, and/or the like.

As discussed previously, in many circumstances, it may be desirable to configure an electronic apparatus such that a user of the electronic apparatus may select a particular operational directive, indicate a specific desire, and/or the like, in a manner that is easy and intuitive for the user. As such, it may be desirable to allow the user to quickly and easily interact with the user's electronic apparatus, to indicate the user's desires, and/or the like. In at least one example embodiment, determination of an operational directive comprises causation of display of at least one operational directive interface element that is associated with the operational directive, and receipt of information indicative of an operational directive selection input associated with the operational directive interface element. For example, the operational directive interface element may be displayed at a display position on a display, and the operational directive selection input may be at a position on the display that corresponds with the display position of the operational directive interface element. In some circumstances, a user may desire to select between more than one operational directive. As such, it may be desirable to present an operational directive interface element such that each operational directive may be selected from, identified, caused to be sent to a separate apparatus, and/or the like. In at least one example embodiment, determination of an operational directive comprises causation of display of at least one operational directive interface element that is associated with an operational directive candidate. The operational directive candidate may be an operational directive that may be identified as the operational directive such that the operational directive is caused to be sent to a separate apparatus. For example, the apparatus may receive information indicative of an operational directive candidate selection input associated with the operational directive interface element that identifies the operational directive candidate as the operational directive.

In order to provide a dynamic and fun user experience, and to provide a user with visual feedback that reflects movement of an apparatus in relation to a charge surface of a charger apparatus, it may be desirable to dynamically display such operational directive interface elements. In at least one example, display of an operational directive interface element comprises display of the operational directive interface element such that the operational directive interface element transitions from a position to a different position such that the operational directive interface element is perceived by a user to move from the position to the different position. In such an example embodiment, the position may be a non-display position, and the different position may be a display position. For example, an operational directive interface element associated with a particular predefined spatial region may be precluded from display while an apparatus is at a charge surface position associated with a different predefined spatial region, while the apparatus is at a charge surface position associated with a center of the charge surface, and/or the like. In at least one example embodiment, an apparatus causes sending of the operational directive to the separate apparatus.

In many circumstances, a user may desire to control more than one separate apparatus. In such an example, the separate apparatus may be associated with more than one predefined spatial region. As such, it may be desirable to allow a user to quickly and intuitively interact with multiple separate apparatus by way of the user's apparatus and charger apparatus. In at least one example embodiment, an apparatus determines that the apparatus has been moved to a different charge surface position on the charger apparatus. In such an example embodiment, the apparatus may determine that the different charge surface position is associated with control of at least one different separate apparatus. As such, the apparatus may determine at least another operational directive associated with control of the different separate apparatus based, at least in part, on the determination that the different charge surface position is associated with control of the different separate apparatus. In at least one example embodiment, the determination of the other operational directive associated with control of the different separate apparatus comprises causation of display of at least one operational directive interface element that is associated with the other operational directive. In such an example embodiment, the apparatus may receive information indicative of an operational directive selection input associated with the operational directive interface element. As such, the apparatus may cause sending of the other operational directive to the different separate apparatus. The other operational directive may be different from the operational directive, may fail to correspond with the operational directive, may correspond with the operational directive, and/or the like.

FIG. 4C is a diagram illustrating an apparatus at a charge surface position on a charger apparatus according to at least one example embodiment. The example of FIG. 4C illustrates the example of FIG. 4A subsequent to moving of apparatus 402 from the center of charger apparatus 404 to the right edge of charger apparatus 404. In the example of FIG. 4C, apparatus 402 is positioned at a charge surface position on the charge surface of charger apparatus 404 that is at the right edge of charger apparatus 404. FIG. 4D is a diagram illustrating an apparatus at a charge surface position on a charger apparatus according to at least one example embodiment. The example of FIG. 4D illustrates the example of FIG. 4A subsequent to moving of apparatus 402 from the center of charger apparatus 404 towards the bottom right corner of charger apparatus 404, the example of FIG. 4C subsequent to moving apparatus 402 from the right edge of charger apparatus 404 to the bottom right corner of charger apparatus 404, and/or the like. In the example of FIG. 4D, apparatus 402 is positioned at a charge surface position on the charge surface of charger apparatus 404. As illustrated, the charge surface position of apparatus 402 is associated with the bottom right corner of charger apparatus 404.

For example, as illustrated in the examples of FIGS. 4C and 4D, apparatus 402 is moved from the charge surface position illustrated in FIG. 4C, and to the charge surface position illustrated in FIG. 4D. In such an example, the predefined spatial region with which apparatus 402 is associated changes from "room B" to "room C, as indicated by predefined spatial region locational indications 420 and 430. In such an example, apparatus 402 may determine and/or cause sending of an operational directive to the separate apparatus. Apparatus 402 may subsequently be repositioned, as illustrated in the example of FIG. 4D, such that apparatus 402 is placed at the lower right corner of charger apparatus 404. As illustrated in the example of FIG. 4D, the charge surface position associated with placement of the apparatus in the lower right corner of the charger surface is associated with "room C", as indicated by predefined spatial region locational indications 430.

In the example of FIG. 4D, operational directive interface elements 432 and 434 are caused to be displayed on display 406 of apparatus 402. In this manner, the repositioning of apparatus 402 such that apparatus 402 is positioned on a charge surface position associated with a different predefined spatial region may cause termination of display of one or more operational directive interface elements. For example, repositioning of apparatus 402 from the charge surface position indicated in FIG. 4C to the charge surface position indicated in FIG. 4D may cause termination of display of operational directive interface elements 422 and 424.

Figure 4E:
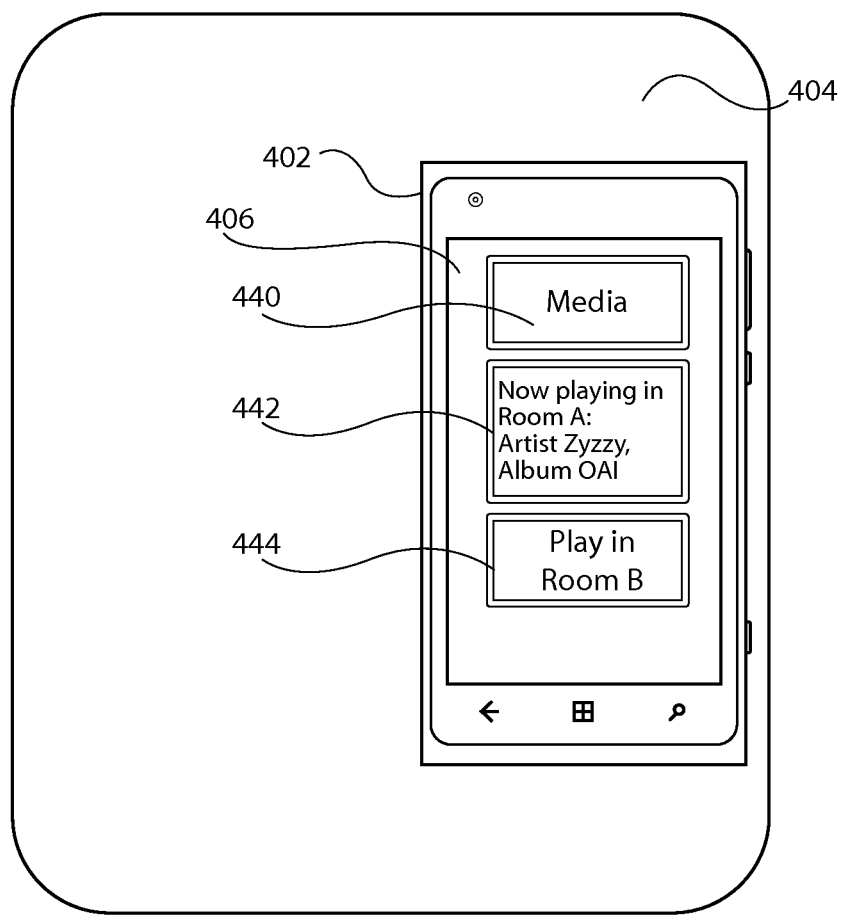

FIG. 4E is a diagram illustrating an apparatus at a charge surface position on a charger apparatus according to at least one example embodiment. The example of FIG. 4E illustrates the example of FIG. 4C subsequent to selection of operational directive interface element 424 of FIG. 4C. In the example of FIG. 4E, display 406 of apparatus 402 is caused to display interface element 440, interface element 442, and operational directive interface element 444.

FIGS. 5A-5D are diagrams illustrating an association correlation table according to at least one example embodiment. The examples of FIGS. 5A-5D are merely examples and do not limit the scope of the claims. For example, association correlation table configuration may vary, associations may vary, association correlation table values may vary, and/or the like.

In order to facilitate interaction with and/or control of one or more separate apparatuses by way of an apparatus and a charger apparatus, it may be desirable to determine that a charge surface position is associated with a specific separate apparatus based, at least in part, on an association correlation table. In at least one example embodiment, an apparatus retrieves information indicative of an association between a charge surface position and a separate apparatus from a charge surface position-separate apparatus association correlation table. In this manner, the determination that a charge surface position is associated with control of a separate apparatus may be based, at least in part, on the charge surface position-separate apparatus association correlation table.

FIG. 5A is a diagram illustrating a charge surface position-separate apparatus association correlation table according to at least one example embodiment. The example of FIG. 5A depicts a charge surface position-separate apparatus association correlation table that comprises information indicative of an association between charge surface position 500 and separate apparatus 501, charge surface position 502 and separate apparatus 503, and charge surface position 504 and separate apparatus 505. For example, charge surface position 504 may correspond with the charge surface position illustrated in the example of FIG. 4D, and separate apparatus 505 may be determined to be a specific separate apparatus that is located within "room C". Such a determination may be based, at least in part, on the information indicative of the association between charge surface position 504 and separate apparatus 505.

In order to facilitate determination of operational directives that may be available for a specific separate apparatus, it may be desirable to determine that the operational directive is associated with and/or available for the specific separate apparatus based, at least in part, on an association correlation table. In at least one example embodiment, an apparatus retrieves information indicative of an association between a separate apparatus and an operational directive from a separate apparatus-operational directive association correlation table. In this manner, the determination of an operational directive that may be associated with control of a separate apparatus may be based, at least in part, on the separate apparatus-operational directive association correlation table.

FIG. 5B is a diagram illustrating a separate apparatus-operational directive association correlation table according to at least one example embodiment. The example of FIG. 5B depicts a separate apparatus-operational directive association correlation table that comprises information indicative of an association between separate apparatus 510 and operational directive 511, between separate apparatus 512 and operational directive 513, and between separate apparatus 514 and operational directive 515. In this manner, a specific operational directive that may be associated with a particular separate apparatus, available for the particular separate apparatus, and/or the like, may be determined based, at least in part, on the information indicative of the association between the separate apparatus and the operational directive comprised by the separate apparatus-operational directive association correlation table.

In order to facilitate determination of a predefined spatial region that may be associated with a particular charge surface position, it may be desirable to determine that the predefined spatial region is associated with the particular charge surface position based, at least in part, on an association correlation table. In at least one example embodiment, an apparatus retrieves information indicative of an association between the charge surface position and the predefined spatial region from a charge surface position-predefined spatial region association correlation table. In this manner, the determination that the charge surface position is associated with control of the separate apparatus may be based, at least in part, on the information indicative of the association between the charge surface position and the predefined spatial region comprised by the charge surface position-predefined spatial region association correlation table.

FIG. 5C is a diagram illustrating a charge surface position-predefined spatial region association correlation table according to at least one example embodiment. The example of FIG. 5C depicts a charge surface position-predefined spatial region association correlation table that comprises information indicative of an association between charge surface position 520 and predefined spatial region 521, between charge surface position 522 and predefined spatial region 523, and between charge surface position 524 and predefined spatial region 525. In this manner, the charge surface position-predefined spatial region association correlation table comprises information indicative of an association between a particular charge surface position and a particular predefined spatial region. For example, the association between a particular charge surface position and a particular predefined spatial region may be based, at least in part, on a charge surface direction associated with the charge surface position corresponding with a separate apparatus direction associated with the predefined spatial region.

In some circumstances, it may be desirable to aggregate and/or maintain an association correlation table that correlates a charge surface position to a predefined spatial region and a separate apparatus within the predefined spatial region. In at least one example embodiment, an apparatus retrieves information indicative of an associated between a predefined spatial region and the separate apparatus from a predefined spatial region-separate apparatus association correlation table. In such an example embodiment, the determination of the predefined spatial region in which the separate apparatus is located may be based, at least in part, on the information indicative of the association between the predefined spatial region and the separate apparatus. In such an example embodiment, the charge surface position may be associated with the predefined spatial region.

FIG. 5D is a diagram illustrating a charge surface position-predefined spatial region-separate apparatus association correlation table according to at least one example embodiment. The example of FIG. 5D depicts a charge surface position-predefined spatial region-separate apparatus association correlation table that comprises information indicative of an association between charge surface position 530, predefined spatial region 531, and separate apparatus 532, between charge surface position 533, predefined spatial region 534, and separate apparatus 535, and between charge surface position 536, predefined spatial region 537, and separate apparatus 538.

Figure 6:
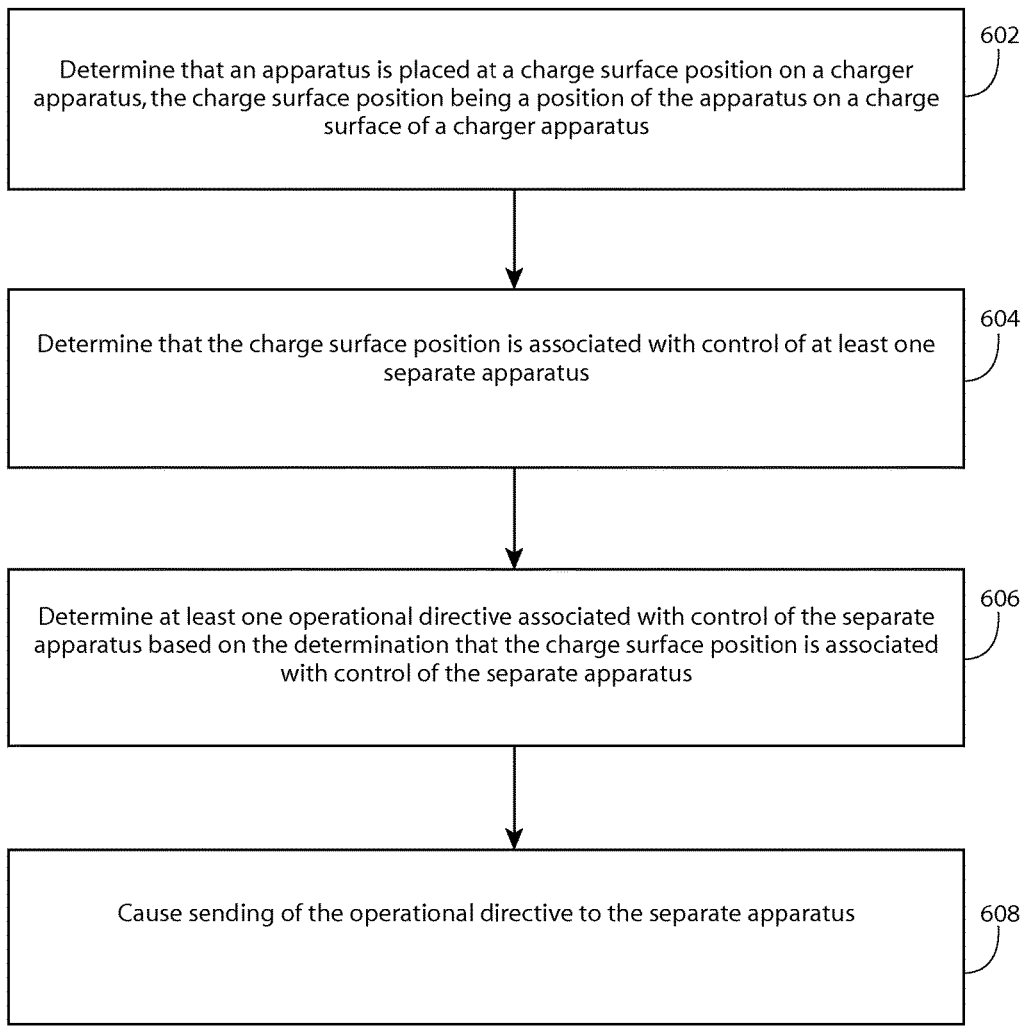
FIG. 6 is a flow diagram illustrating activities associated with causation of sending of an operational directive to a separate apparatus according to at least one example embodiment.

FIG. 6 is a flow diagram illustrating activities associated with causation of sending of an operational directive to a separate apparatus according to at least one example embodiment. In at least one example embodiment, there is a set of operations that corresponds with the activities of FIG. 6. An apparatus, for example electronic apparatus 10 of FIG. 1, or a portion thereof, may utilize the set of operations. The apparatus may comprise means, including, for example processor 11 of FIG. 1, for performance of such operations. In an example embodiment, an apparatus, for example electronic apparatus 10 of FIG. 1, is transformed by having memory, for example memory 12 of FIG. 1, comprising computer code configured to, working with a processor, for example processor 11 of FIG. 1, cause the apparatus to perform set of operations of FIG. 6.

At block 602, the apparatus determines that the apparatus is placed at a charge surface position on a charger apparatus. In at least one example embodiment, the charge surface position is a position of the apparatus on the charge surface of the charger apparatus. In one or more example embodiments, the apparatus is configured to receive a charge signal from the charger apparatus based, at least in part, on placement of the apparatus at the charge surface position. The determination, the charge surface position, the charger apparatus, the charge surface, and the charge signal may be similar as described regarding FIG. 2, FIG. 3, and FIGS. 4A-4E.

At block 604, the apparatus determines that the charge surface position is associated with control of at least one separate apparatus. The determination, the association, and the separate apparatus may be similar as described regarding FIG. 3, FIGS. 4A-4E, and FIGS. 5A-5D.

At block 606, the apparatus determines at least one operational directive associated with control of the separate apparatus based, at least in part, on the determination that the charge surface position is associated with control of the separate apparatus. The determination and the operational directive may be similar as described regarding FIGS. 4A-4E and FIGS. 5A-5D.

At block 608, the apparatus causes sending of the operational directive to the separate apparatus. The causation and the sending of the operational directive to the separate apparatus may be similar as described regarding FIG. 2, FIG. 3, FIGS. 4A-4E, and FIGS. 5A-5D.

Figure 7:
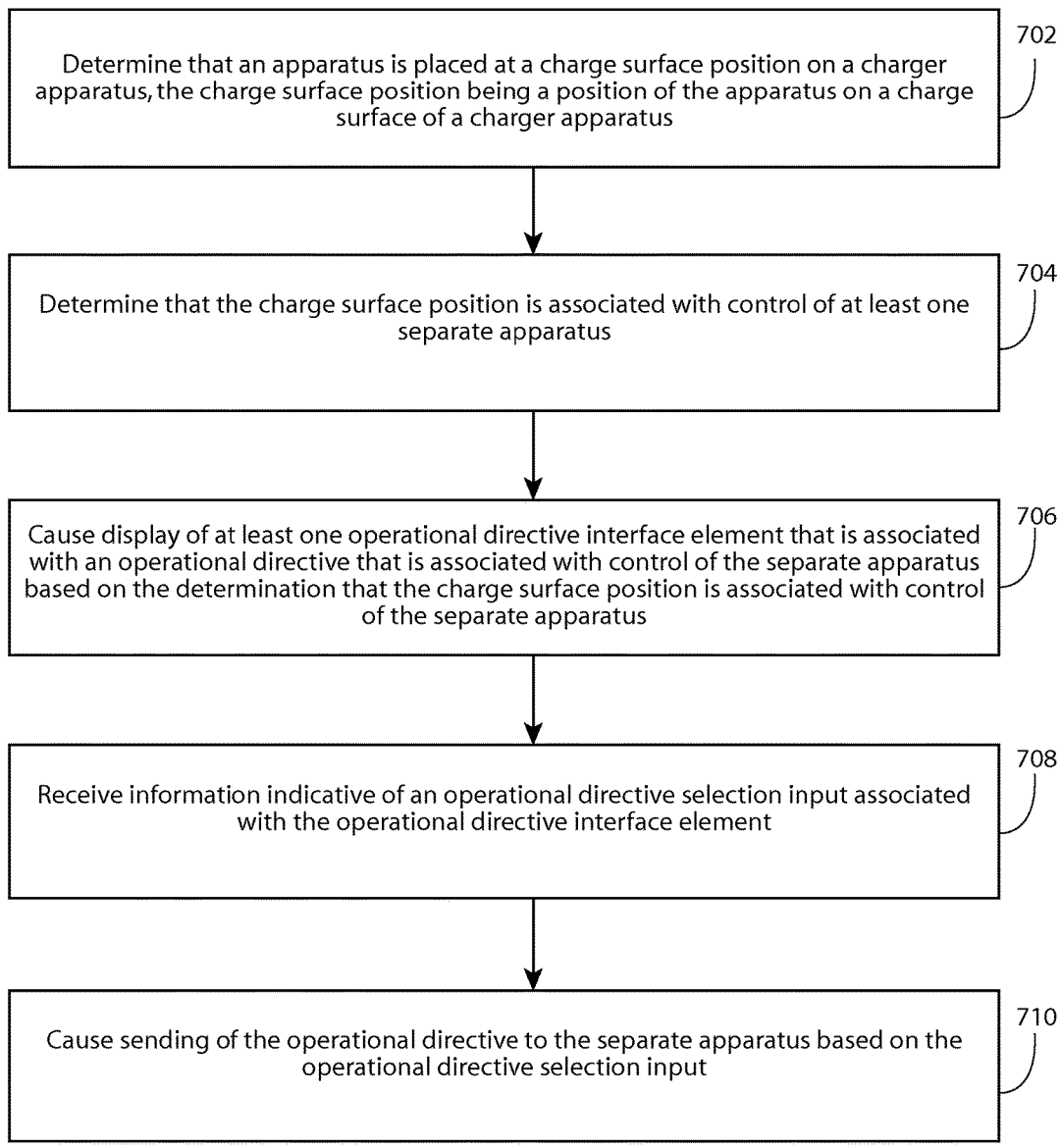
FIG. 7 is a flow diagram illustrating activities associated with causation of sending of an operational directive to a separate apparatus based, at least in part, on an operational directive selection input according to at least one example embodiment.

FIG. 7 is a flow diagram illustrating activities associated with causation of sending of an operational directive to a separate apparatus based, at least in part, on an operational directive selection input according to at least one example embodiment. In at least one example embodiment, there is a set of operations that corresponds with the activities of FIG. 7. An apparatus, for example electronic apparatus 10 of FIG. 1, or a portion thereof, may utilize the set of operations. The apparatus may comprise means, including, for example processor 11 of FIG. 1, for performance of such operations. In an example embodiment, an apparatus, for example electronic apparatus 10 of FIG. 1, is transformed by having memory, for example memory 12 of FIG. 1, comprising computer code configured to, working with a processor, for example processor 11 of FIG. 1, cause the apparatus to perform set of operations of FIG. 7.

As discussed previously, in many circumstances, a user may desire to indicate a desire to cause sending of a particular operational directive to a separate apparatus by way of an operational directive selection input.

At block 702, the apparatus determines that the apparatus is placed at a charge surface position on a charger apparatus. In at least one example embodiment, the charge surface position is a position of the apparatus on the charge surface of the charger apparatus. In one or more example embodiments, the apparatus is configured to receive a charge signal from the charger apparatus based, at least in part, on placement of the apparatus at the charge surface position. The determination, the charge surface position, the charger apparatus, the charge surface, and the charge signal may be similar as described regarding FIG. 2, FIG. 3, and FIGS. 4A-4E.

At block 704, the apparatus determines that the charge surface position is associated with control of at least one separate apparatus. The determination, the association, and the separate apparatus may be similar as described regarding FIG. 3, FIGS. 4A-4E, and FIGS. 5A-5D.

At block 706, the apparatus causes display of at least one operational directive interface element that is associated with an operational directive based, at least in part, on the determination that the charge surface position is associated with control of the separate apparatus. In at least one example embodiment, the operational directive is associated with control of the separate apparatus. The causation, the display, the operational directive, and the operational directive interface element may be similar as described regarding FIG. 2, FIG. 3, FIGS. 4A-4E, and FIGS. 5A-5D.

At block 708, the apparatus receives information indicative of an operational directive selection input associated with the operational directive interface element. The receipt and the operational directive selection input may be similar as described regarding FIG. 2, FIG. 3, and FIGS. 4A-4E.

At block 710, the apparatus causes sending of the operational directive to the separate apparatus based, at least in part, on the operational directive selection input. The causation and the sending of the operational directive to the separate apparatus may be similar as described regarding FIG. 2, FIG. 3, FIGS. 4A-4E, and FIGS. 5A-5D.

Figure 8:
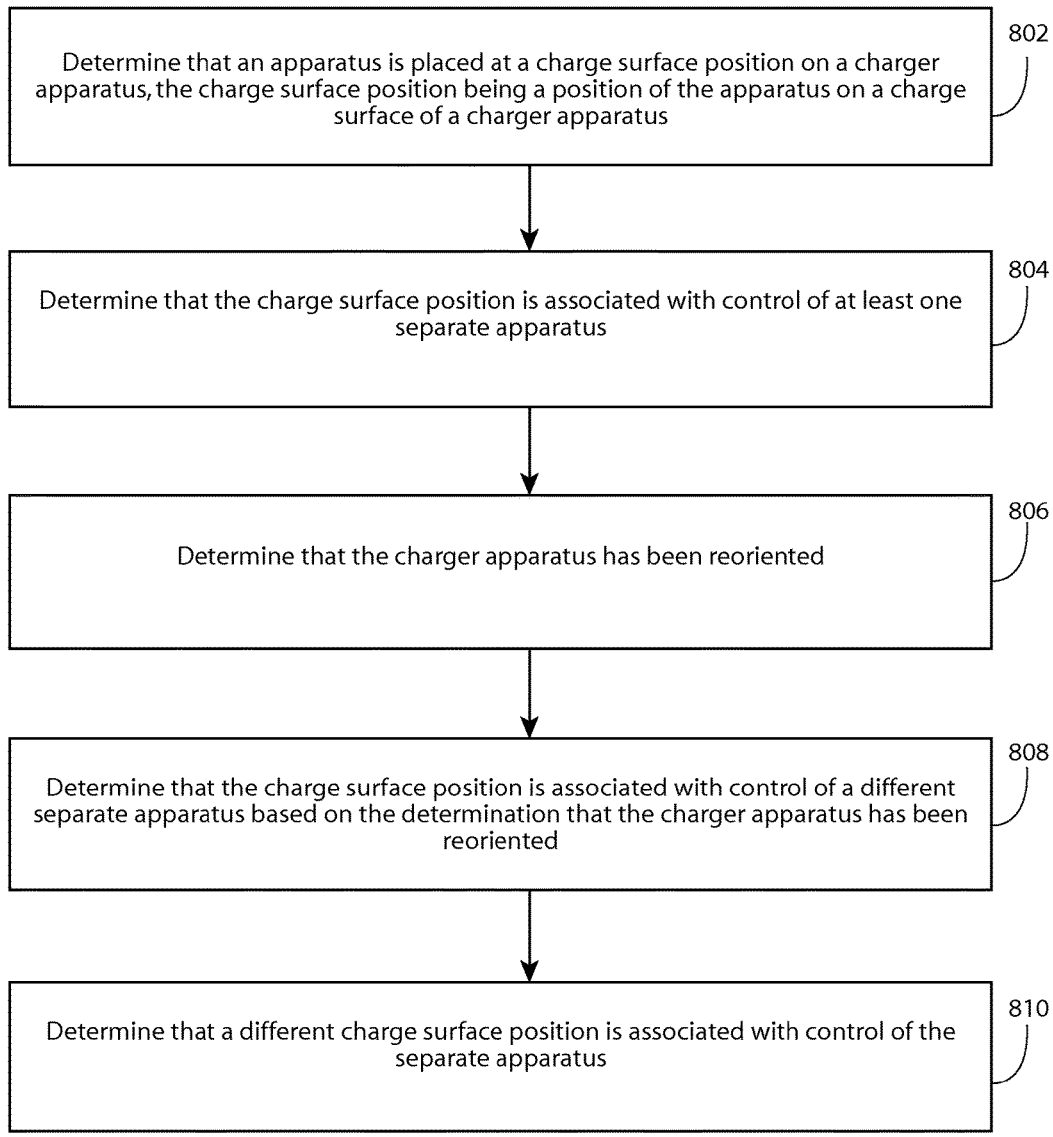
FIG. 8 is a flow diagram illustrating activities associated with determination that a charger apparatus has been reoriented according to at least one example embodiment.

FIG. 8 is a flow diagram illustrating activities associated with determination that a charger apparatus has been reoriented according to at least one example embodiment. In at least one example embodiment, there is a set of operations that corresponds with the activities of FIG. 8. An apparatus, for example electronic apparatus 10 of FIG. 1, or a portion thereof, may utilize the set of operations. The apparatus may comprise means, including, for example processor 11 of FIG. 1, for performance of such operations. In an example embodiment, an apparatus, for example electronic apparatus 10 of FIG. 1, is transformed by having memory, for example memory 12 of FIG. 1, comprising computer code configured to, working with a processor, for example processor 11 of FIG. 1, cause the apparatus to perform set of operations of FIG. 8.

As the correlation between charge surface directions and separate apparatus is based, at least in part, on a known orientation of an electronic apparatus, a charger apparatus, and/or the like, it may be desirable to allow for reconfiguration of such associations, reallocation of charge surface positions, and/or the like. In at least one example embodiment, an apparatus determines that the charger apparatus has been reoriented. In such an example embodiment, the determination that the charger apparatus has been reoriented may comprise receipt of information indicative of reorientation of the charger apparatus, and determination that the charger apparatus has been reoriented based, at least in part, on the information indicative of reorientation of the charger apparatus. The information indicative of reorientation of the charger apparatus may be received from at least one sensor. For example, the sensor may be a motion sensor, an orientation sensor, an accelerometer sensor, a compass sensor, a location sensor, and/or the like. The sensor may be comprised by an apparatus, comprised by a separate apparatus, and/or the like. In this manner, the information indicative of reorientation of the charger apparatus may be received from the charger apparatus, received from a server, and/or the like. In such an example embodiment, the determination that the charge surface position is associated with control of a different separate apparatus may be based, at least in part, on the determination that the charger apparatus has been reoriented.

In some circumstances, it may be desirable to maintain correspondence between charge surface directions and separate apparatus directions. As such, it may be desirable to modify charge surface position associations such that correspondence between charge surface directions and separate apparatus directions is maintained. In at least one example embodiment, an apparatus determines that a different charge surface position is associated with control of the separate apparatus. In such an example embodiment, a user may reposition an apparatus on the charge surface such that the apparatus maintains its association with the separate apparatus. As such, the apparatus may determine that the apparatus has been moved to the different charge surface position.

At block 802, the apparatus determines that the apparatus is placed at a charge surface position on a charger apparatus. In at least one example embodiment, the charge surface position is a position of the apparatus on the charge surface of the charger apparatus. In one or more example embodiments, the apparatus is configured to receive a charge signal from the charger apparatus based, at least in part, on placement of the apparatus at the charge surface position. The determination, the charge surface position, the charger apparatus, the charge surface, and the charge signal may be similar as described regarding FIG. 2, FIG. 3, and FIGS. 4A-4E.

At block 804, the apparatus determines that the charge surface position is associated with control of at least one separate apparatus. The determination, the association, and the separate apparatus may be similar as described regarding FIG. 3, FIGS. 4A-4E, and FIGS. 5A-5D.

At block 806, the apparatus determines that the charger apparatus has been reoriented.

At block 808, the apparatus determines that the charge surface position is associated with control of a different separate apparatus based, at least in part, on the determination that the charger apparatus has been reoriented. The determination, the association, and the different separate apparatus may be similar as described regarding FIG. 3, FIGS. 4A-4E, and FIGS. 5A-5D.

At block 810, the apparatus determines that a different charge surface position is associated with control of the separate apparatus. The determination, the association, and the different charge surface position may be similar as described regarding FIG. 3, FIGS. 4A-4E, and FIGS. 5A-5D.

Figure 9:
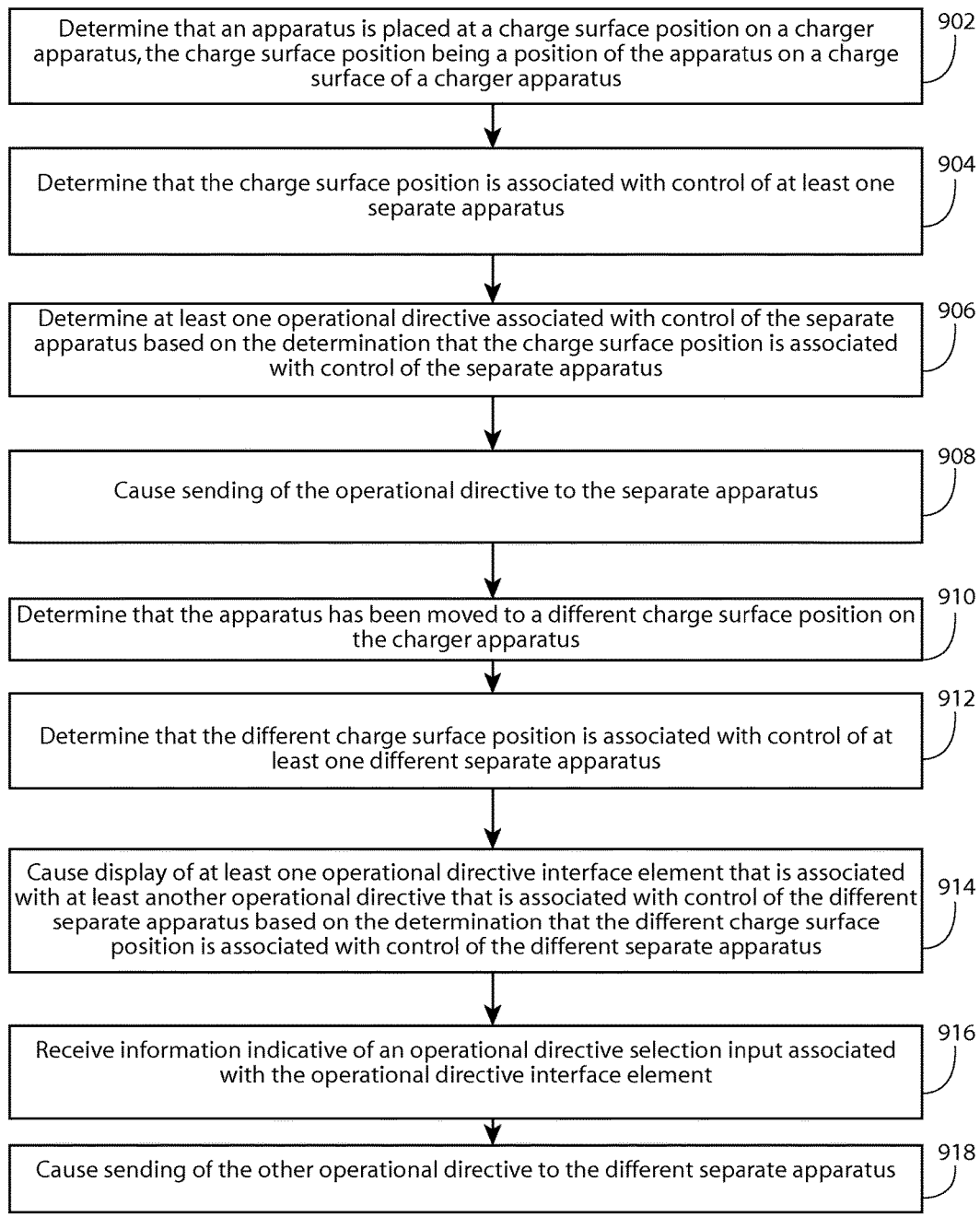
FIG. 9 is a flow diagram illustrating activities associated with determination that an apparatus has been moved to a different charge surface position on a charger apparatus according to at least one example embodiment.

FIG. 9 is a flow diagram illustrating activities associated with determination that an apparatus has been moved to a different charge surface position on a charger apparatus according to at least one example embodiment. In at least one example embodiment, there is a set of operations that corresponds with the activities of FIG. 9. An apparatus, for example electronic apparatus 10 of FIG. 1, or a portion thereof, may utilize the set of operations. The apparatus may comprise means, including, for example processor 11 of FIG. 1, for performance of such operations. In an example embodiment, an apparatus, for example electronic apparatus 10 of FIG. 1, is transformed by having memory, for example memory 12 of FIG. 1, comprising computer code configured to, working with a processor, for example processor 11 of FIG. 1, cause the apparatus to perform set of operations of FIG. 9.

As discussed previously, in many circumstances, a user may desire to interact with more than one separate apparatus. As such, the user may reposition an apparatus from a charge surface position that may be associated with a separate apparatus to a different charge surface position that may be associated with a different separate apparatus.

At block 902, the apparatus determines that the apparatus is placed at a charge surface position on a charger apparatus. In at least one example embodiment, the charge surface position is a position of the apparatus on the charge surface of the charger apparatus. In one or more example embodiments, the apparatus is configured to receive a charge signal from the charger apparatus based, at least in part, on placement of the apparatus at the charge surface position. The determination, the charge surface position, the charger apparatus, the charge surface, and the charge signal may be similar as described regarding FIG. 2, FIG. 3, and FIGS. 4A-4E.

At block 904, the apparatus determines that the charge surface position is associated with control of at least one separate apparatus. The determination, the association, and the separate apparatus may be similar as described regarding FIG. 3, FIGS. 4A-4E, and FIGS. 5A-5D.

At block 906, the apparatus determines at least one operational directive associated with control of the separate apparatus based, at least in part, on the determination that the charge surface position is associated with control of the separate apparatus. The determination and the operational directive may be similar as described regarding FIGS. 4A-4E and FIGS. 5A-5D.

At block 908, the apparatus causes sending of the operational directive to the separate apparatus. The causation and the sending of the operational directive to the separate apparatus may be similar as described regarding FIG. 2, FIG. 3, FIGS. 4A-4E, and FIGS. 5A-5D.

At block 910, the apparatus determines that the apparatus has been moved to a different charge surface position on the charger apparatus. The determination and the different charge surface position may be similar as described regarding FIG. 2, FIG. 3, FIGS. 4A-4E, and FIGS. 5A-5D.

At block 912, the apparatus determines that the different charge surface position is associated with control of at least one different separate apparatus. The determination, the association, and the different separate apparatus may be similar as described regarding FIG. 2, FIG. 3, FIGS. 4A-4E, and FIGS. 5A-5D.

At block 914, the apparatus causes display of at least one operational directive interface element that is associated with at least another operational directive based, at least in part, on the determination that the different charge surface position is associated with control of the different separate apparatus. In at least one example embodiment, the other operational directive is associated with control of the different separate apparatus. The causation, the display, the operational directive, and the operational directive interface element may be similar as described regarding FIG. 2, FIG. 3, FIGS. 4A-4E, and FIGS. 5A-5D.

At block 916, the apparatus receives information indicative of an operational directive selection input associated with the operational directive interface element. The receipt and the operational directive selection input may be similar as described regarding FIG. 2, FIG. 3, and FIGS. 4A-4E.

At block 918, the apparatus causes sending of the other operational directive to the different separate apparatus. The causation and the sending of the other operational directive to the different separate apparatus may be similar as described regarding FIG. 2, FIG. 3, FIGS. 4A-4E, and FIGS. 5A-5D.

Figure 10:
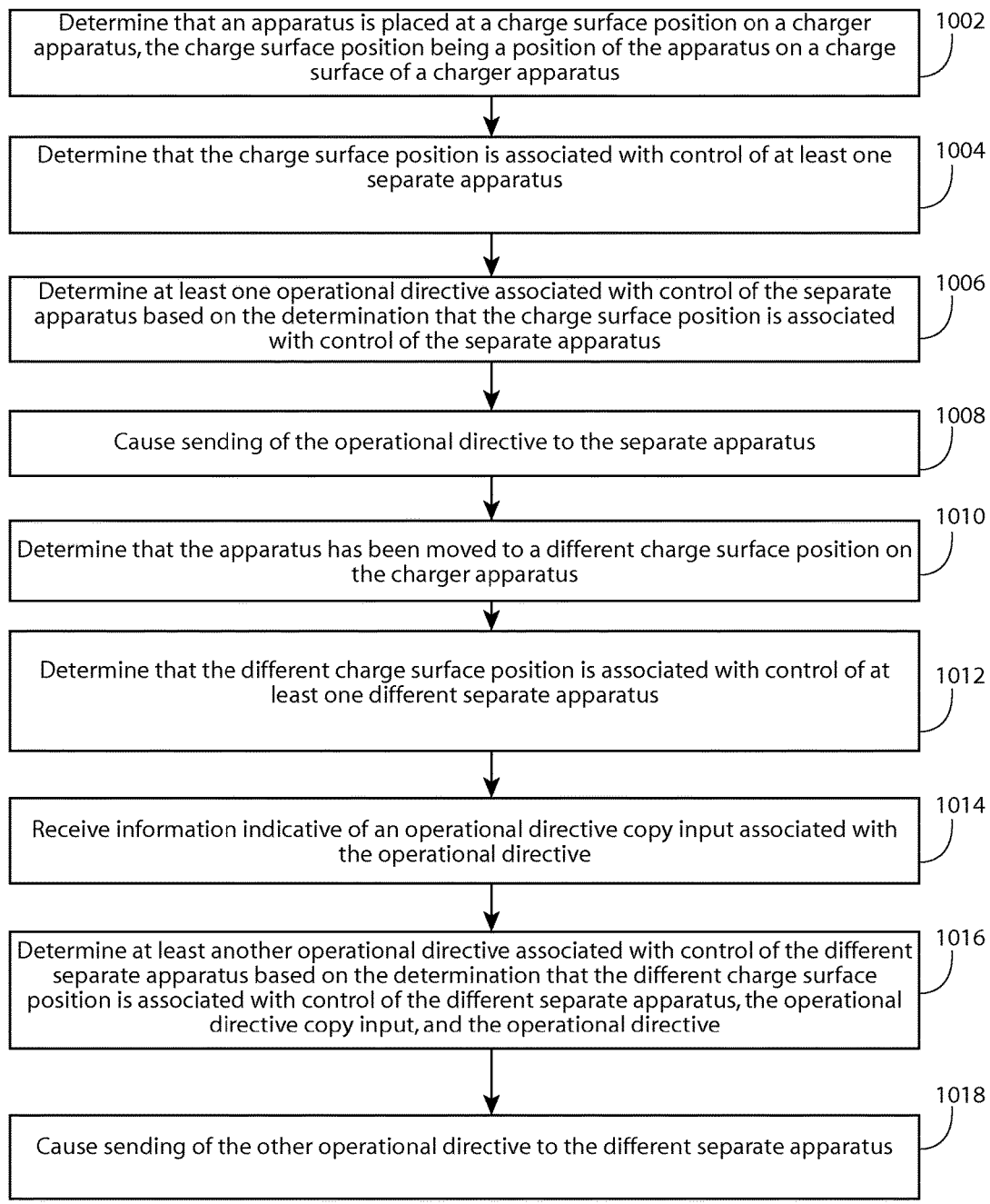
FIG. 10 is a flow diagram illustrating activities associated with receipt of information indicative of an operational directive copy input associated with an operational directive according to at least one example embodiment.

FIG. 10 is a flow diagram illustrating activities associated with receipt of information indicative of an operational directive copy input associated with an operational directive according to at least one example embodiment. In at least one example embodiment, there is a set of operations that corresponds with the activities of FIG. 10. An apparatus, for example electronic apparatus 10 of FIG. 1, or a portion thereof, may utilize the set of operations. The apparatus may comprise means, including, for example processor 11 of FIG. 1, for performance of such operations. In an example embodiment, an apparatus, for example electronic apparatus 10 of FIG. 1, is transformed by having memory, for example memory 12 of FIG. 1, comprising computer code configured to, working with a processor, for example processor 11 of FIG. 1, cause the apparatus to perform set of operations of FIG. 10.

In many circumstances, a user may desire to interact with multiple separate apparatuses in similar manners. For example, the user may be throwing a party and may desire to play the same music throughout the user's house, by way of all of the user's separate apparatuses, and/or the like. As such, it may be desirable to provide the user with a simple and intuitive manner in which to duplicate operational directives, to control a plurality of separate apparatuses in a similar manner, and/or the like. In at least one example embodiment, an apparatus receives information indicative of an operational directive copy input associated with an operational directive. In such an example embodiment, the apparatus may determine another operational directive such that the other operational directive corresponds with the operational directive, is based, at least in part, on the operational directive, and/or the like. In this manner, the user may quickly and easily cause sending of similar operational directives to multiple separate apparatuses.

At block 1002, the apparatus determines that the apparatus is placed at a charge surface position on a charger apparatus. In at least one example embodiment, the charge surface position is a position of the apparatus on the charge surface of the charger apparatus. In one or more example embodiments, the apparatus is configured to receive a charge signal from the charger apparatus based, at least in part, on placement of the apparatus at the charge surface position. The determination, the charge surface position, the charger apparatus, the charge surface, and the charge signal may be similar as described regarding FIG. 2, FIG. 3, and FIGS. 4A-4E.

At block 1004, the apparatus determines that the charge surface position is associated with control of at least one separate apparatus. The determination, the association, and the separate apparatus may be similar as described regarding FIG. 3, FIGS. 4A-4E, and FIGS. 5A-5D.

At block 1006, the apparatus determines at least one operational directive associated with control of the separate apparatus based, at least in part, on the determination that the charge surface position is associated with control of the separate apparatus. The determination and the operational directive may be similar as described regarding FIGS. 4A-4E and FIGS. 5A-5D.

At block 1008, the apparatus causes sending of the operational directive to the separate apparatus. The causation and the sending of the operational directive to the separate apparatus may be similar as described regarding FIG. 2, FIG. 3, FIGS. 4A-4E, and FIGS. 5A-5D.

At block 1010, the apparatus determines that the apparatus has been moved to a different charge surface position on the charger apparatus. The determination and the different charge surface position may be similar as described regarding FIG. 2, FIG. 3, FIGS. 4A-4E, and FIGS. 5A-5D.

At block 1012, the apparatus determines that the different charge surface position is associated with control of at least one different separate apparatus. The determination, the association, and the different separate apparatus may be similar as described regarding FIG. 2, FIG. 3, FIGS. 4A-4E, and FIGS. 5A-5D.

At block 1014, the apparatus receives information indicative of an operational directive copy input associated with the operational directive.

At block 1016, the apparatus determines at least another operational directive associated with control of the different separate apparatus based, at least in part, on the determination that the different charge surface position is associated with control of the different separate apparatus and the operational directive copy input. In at least one example embodiment, the other operational directive is based, at least in part, on the operational directive.

At block 1018, the apparatus causes sending of the other operational directive to the different separate apparatus. The causation and the sending of the other operational directive to the different separate apparatus may be similar as described regarding FIG. 2, FIG. 3, FIGS. 4A-4E, and FIGS. 5A-5D.

Embodiments of the invention may be implemented in software, hardware, application logic or a combination of software, hardware, and application logic. The software, application logic and/or hardware may reside on the apparatus, a separate device, or a plurality of separate devices. If desired, part of the software, application logic and/or hardware may reside on the apparatus, part of the software, application logic and/or hardware may reside on a separate device, and part of the software, application logic and/or hardware may reside on a plurality of separate devices. In an example embodiment, the application logic, software or an instruction set is maintained on any one of various conventional computer-readable media.

If desired, the different functions discussed herein may be performed in a different order and/or concurrently with each other. For example, block 1014 of FIG. 10 may be performed before block 1010 of FIG. 10. Furthermore, if desired, one or more of the above-described functions may be optional or may be combined. For example, block 810 of FIG. 8 may be optional and/or combined with block 808 of FIG. 8.

Although various aspects of the invention are set out in the independent claims, other aspects of the invention comprise other combinations of features from the described embodiments and/or the dependent claims with the features of the independent claims, and not solely the combinations explicitly set out in the claims.

It is also noted herein that while the above describes example embodiments of the invention, these descriptions should not be viewed in a limiting sense. Rather, there are variations and modifications which may be made without departing from the scope of the present invention as defined in the appended claims.

What is claimed is:

1. An apparatus, comprising:
   at least one processor;
   at least one memory including computer program code, the memory and the computer program code configured to, working with the processor, cause the apparatus to perform at least the following:
   determination that the apparatus is placed at a charge surface position on a charger apparatus, the charge surface position being a position of the apparatus on a charge surface of the charger apparatus, and the apparatus being configured to receive a charge signal from the charger apparatus based, at least in part, on placement of the apparatus at the charge surface position;
   determination that the charge surface position is associated with control of at least one separate apparatus;
   determination of one of predefined spatial regions each having an identification, wherein the separate apparatus is located in the one of the predefined spatial regions;
   determination of at least one operational directive associated with control of the separate apparatus based, at least in part, on the determination that the charge surface position is associated with control of the separate apparatus;
   causation of sending of the operational directive to the separate apparatus and of display of the identification of the one of the predefined spatial regions; and
   in response to a movement of the apparatus towards a second charge surface position, causation of sending of a second operational directive to a second separate apparatus and of shifting the display of the identification of the one of the predefined spatial regions to a display of a second identification of another one of the predefined spatial regions in which the second separate apparatus is located.

2. The apparatus of claim 1, wherein the determination of the operational directive comprises causation of display of at least one operational directive interface element that is associated with the operational directive, and receipt of information indicative of an operational directive selection input associated with the operational directive interface element.

3. The apparatus of claim 1, wherein the determination that the apparatus has been placed at the charge surface position on the charger apparatus comprises receipt of information indicative of the charge surface position.

4. The apparatus of claim 3, wherein the information indicative of the charge surface position is received from at least one sensor comprised by the apparatus.

5. The apparatus of claim 1, wherein a direction of the separate apparatus from the charger apparatus indicates a direction from a spatial location of the charger apparatus to the one of the predefined spatial regions.

6. The apparatus of claim 1, wherein the memory includes computer program code configured to, working with the processor, cause the apparatus to perform:
   determination that the charger apparatus has been reoriented; and
   determination that the charge surface position is associated with control of a different separate apparatus based, at least in part, on the determination that the charger apparatus has been reoriented.

7. The apparatus of claim 1, wherein the memory includes computer program code configured to, working with the processor, cause the apparatus to perform:
   determination that the apparatus has been moved to a different charge surface position on the charger apparatus; and
   determination that the different charge surface position is associated with control of at least one different separate apparatus.

8. The apparatus of claim 7, wherein the memory includes computer program code configured to, working with the processor, cause the apparatus to perform determination of at least another operational directive associated with control of the different separate apparatus based, at least in part, on the determination that the different charge surface position is associated with control of the different separate apparatus.

9. A method comprising:
   determining that an apparatus is placed at a charge surface position on a charger apparatus, the charge surface position being a position of the apparatus on a charge surface of the charger apparatus, and the apparatus being configured to receive a charge signal from the charger apparatus based, at least in part, on placement of the apparatus at the charge surface position;
   determining that the charge surface position is associated with control of at least one separate apparatus;

determining one of predefined spatial regions each having an identification, wherein the separate apparatus is located in the one of the predefined spatial regions;

determining at least one operational directive associated with control of the separate apparatus based, at least in part, on the determination that the charge surface position is associated with control of the separate apparatus;

causing sending of the operational directive to the separate apparatus and display of the identification of the one of the predefined spatial regions; and in response to a movement of the apparatus towards a second charge surface position, causation of sending of a second operational directive to a second separate apparatus and of shifting the display of the identification of the one of the predefined spatial regions to a display of a second identification of another one of the predefined spatial regions in which the second separate apparatus is located.

10. The method of claim 9, wherein the determination of the operational directive comprises causing display of at least one operational directive interface element that is associated with the operational directive, and receiving information indicative of an operational directive selection input associated with the operational directive interface element.

11. The method of claim 9, wherein a direction of the separate apparatus from the charger apparatus indicates a direction from a spatial location of the charger apparatus to the one of the predefined spatial regions.

12. The method of claim 9, further comprising:
determining that the charger apparatus has been reoriented; and
determining that the charge surface position is associated with control of a different separate apparatus based, at least in part, on the determination that the charger apparatus has been reoriented.

13. The method of claim 9, further comprising:
determining that the apparatus has been moved to a different charge surface position on the charger apparatus; and
determining that the different charge surface position is associated with control of at least one different separate apparatus.

14. The method of claim 13, further comprising determining at least another operational directive associated with control of the different separate apparatus based, at least in part, on the determination that the different charge surface position is associated with control of the different separate apparatus.

15. At least one computer-readable medium encoded with instructions that, when executed by a processor, perform:
determination that an apparatus is placed at a charge surface position on a charger apparatus, the charge surface position being a position of the apparatus on a charge surface of the charger apparatus, and the apparatus being configured to receive a charge signal from the charger apparatus based, at least in part, on placement of the apparatus at the charge surface position;
determination that the charge surface position is associated with control of at least one separate apparatus;
determination of one of predefined spatial regions each having an identification, wherein the separate apparatus is located in the one of the predefined spatial regions;
determination of at least one operational directive associated with control of the separate apparatus based, at least in part, on the determination that the charge surface position is associated with control of the separate apparatus;
causation of sending of the operational directive to the separate apparatus and of display of the identification of the one of the predefined spatial regions; and
in response to a movement of the apparatus towards a second charge surface position, causation of sending of a second operational directive to a second separate apparatus and of shifting the display of the identification of the one of the predefined spatial regions to a display of a second identification of another one of the predefined spatial regions in which the second separate apparatus is located.

16. The medium of claim 15, wherein the determination of the operational directive comprises causation of display of at least one operational directive interface element that is associated with the operational directive, and receipt of information indicative of an operational directive selection input associated with the operational directive interface element.

17. The medium of claim 15, wherein a direction of the separate apparatus from the charger apparatus indicates a direction from a spatial location of the charger apparatus to the one of the predefined spatial regions.

* * * * *